US007512315B2

(12) United States Patent
Kaminski et al.

(10) Patent No.: US 7,512,315 B2
(45) Date of Patent: Mar. 31, 2009

(54) MANAGING TIME SHIFT BUFFERS

(75) Inventors: Dariusz S. Kaminski, Duluth, GA (US); Arturo A. Rodriguez, Norcross, GA (US); Robert O. Banker, Cumming, GA (US); Valerie G. Gutknecht, Woodstock, GA (US)

(73) Assignee: Cisco Technology, Inc., San Jose, CA (US)

( * ) Notice: Subject to any disclaimer, the term of this patent is extended or adjusted under 35 U.S.C. 154(b) by 1421 days.

(21) Appl. No.: 10/143,647

(22) Filed: May 10, 2002

(65) Prior Publication Data

US 2002/0199185 A1    Dec. 26, 2002

Related U.S. Application Data

(60) Provisional application No. 60/290,315, filed on May 11, 2001.

(51) Int. Cl.
*H04N 5/91* (2006.01)

(52) U.S. Cl. ......................................... 386/68; 386/125

(58) Field of Classification Search .................. 386/46, 386/68, 83, 95, 125
See application file for complete search history.

(56) References Cited

U.S. PATENT DOCUMENTS

| | | | |
|---|---|---|---|
| 4,706,121 A | 11/1987 | Young | 358/142 |
| 4,908,713 A | 3/1990 | Levine | 358/335 |
| 4,963,994 A | 10/1990 | Levine | 358/335 |
| 5,253,066 A | 10/1993 | Vogel | 358/188 |
| 5,293,357 A | 3/1994 | Hallenbeck | 348/734 |
| 5,371,551 A | 12/1994 | Logan et al. | 348/571 |
| 5,438,423 A | 8/1995 | Lynch et al. | 358/335 |
| 5,477,262 A | 12/1995 | Banker et al. | 348/7 |
| 5,479,268 A | 12/1995 | Young et al. | 358/335 |
| 5,508,815 A | 4/1996 | Levine | 358/335 |
| 5,568,272 A | 10/1996 | Levine | 386/48 |
| 5,809,204 A | 9/1998 | Young et al. | 386/83 |
| 5,915,068 A | 6/1999 | Levine | 386/83 |
| 6,002,832 A | 12/1999 | Yoneda | 386/65 |
| 6,014,727 A | 1/2000 | Creemer | 711/118 |
| RE36,801 E | 8/2000 | Logan et al. | 348/571 |
| 6,100,883 A | 8/2000 | Hoarty | 345/327 |
| 6,233,390 B1 | 5/2001 | Yoneda | 386/46 |
| 6,490,000 B1 * | 12/2002 | Schaefer et al. | 348/553 |
| 6,868,225 B1 * | 3/2005 | Brown et al. | 386/83 |
| 2003/0035650 A1 * | 2/2003 | Demas et al. | 386/112 |

(Continued)

FOREIGN PATENT DOCUMENTS

WO    WO 00/04726    1/2000

OTHER PUBLICATIONS

Scientific-Atlanta, Inc. Pending U.S. Appl. No. 10/010,270, filed Dec. 6, 2001, Title: "Controlling Substantially Constant Buffer Capacity for Personal Video Recording With Consistent User Interface of Available Disk Space," Inventors: Harold J. Plourde, Jr. and Arturo A. Rodriguez.

(Continued)

*Primary Examiner*—Huy T Nguyen

(57) ABSTRACT

Systems and methods are provided for managing a time-shift buffer (TSB) that is used for buffering video presentations. One such method includes receiving user input identifying a storage capacity for the TSB and modifying a storage capacity of the TSB such that it is at least substantially equal to the storage capacity identified by the user input.

26 Claims, 19 Drawing Sheets

U.S. PATENT DOCUMENTS

2006/0140584 A1* 6/2006 Ellis et al. .................... 386/83

OTHER PUBLICATIONS

Scientific-Atlanta, Inc. Pending U.S. Appl. No. 10/008,624, filed Dec. 6, 2001, Title: "Converting Time-Shift Buffering for Personal Video Recording Into Permanent Recordings," Inventors: Harold J. Plourde, Jr. and Arturo A. Rodriguez.

Scientific-Atlanta, Inc. Pending U.S. Appl. No. 10/010,781, filed Dec. 5, 2001, Title: "Application Management and Interface for Cluster Control of Time Shift Buffer," Inventor: Harold J. Plourde, Jr.

Scientific-Atlanta, Inc. Pending U.S. Appl. No. 10/005,628, filed Dec. 5, 2001, Title: "Disk Driver Cluster Management of Time Shift Buffer with File Allocation Table Structure," Inventor: Harold J. Plourde, Jr.

Scientific-Atlanta, Inc. Pending U.S. Appl. No. 10/008,439, filed Dec. 6, 2001, Title: "Dividing and Managing Time-Shift Buffering Into Program Specific Segments Bases on Defined Durations," Inventors: Harold J. Plourde, Jr. and Arturo A: Rodriguez.

Scientific-Atlanta, Inc. Pending U.S. Appl. No. 10/015,349, filed Dec. 11, 2001, Title: "Controlling Personal Video Recording Functions from Interactive Television," Inventors: Mark E. Schutte and Valerie G. Gutknecht.

Scientific-Atlanta, Inc. Pending U.S. Appl. No. 10/102,043, filed Mar. 20, 2002, Title: "Composite Buffering," Inventors: John Eric West and Arturo A. Rodriguez.

Scientific-Atlanta, Inc. Pending U.S. Appl. No. 10/034,028, filed Dec. 20, 2001, Title: "Program Position User Interface for Personal Video Recording Time Shift Buffer," Inventors: Dariusz S. Kaminski and Robert O. Banker.

Scientific-Atlanta, Inc. Pending U.S. Appl. No. 10/143,123, filed May 10, 2002, Title: "Channel Buffering and Display Management System for Multi-Tuner Set-Top Box," Inventors: Arturo A. Rodriguez and Ramesh Nallur.

* cited by examiner

Recorded Programs List

JAG

Save: Until Erase
Quality: Good (INFO) Details

Recording Space: 23 hr 28 min (Video)

| Title | Date | Time | Length |
|---|---|---|---|
| ER | Thu 10/19 | 10:00 pm | 1 hr 0min |
| Friends | Thu 10/12 | 8:11 pm | 19 min |
| JAG | Tue 10/03 | 8:00 pm | 1 hr 0min |
| Right From Birth | Tue 10/10 | 10:00 pm | 1 hr 0min |
| Rugrats | Tue 11/05 | 7:33 pm | 25min |

◁ (SEL) ▷    B  Record Options

▷ Play    C  Recording Schedule

FIG. 8

Buffered Programs List

| | News at 11 | | |
| --- | --- | --- | --- |
| | Channel 5 | | |
| | Rating: N/A | (Video) | |
| | (INFO) Details | | |

| Title | Broadcast time | Time Available | Record |
| --- | --- | --- | --- |
| Fantasia | 7:00 pm - 9:00 pm | 8:50 pm - 9:00 pm | No |
| Braves vs. Dodgers | 9:00 pm - 12:00 am | 9:00 pm - 11:00 pm | No |
| News at 11 ⟵ 1322 | 11:00 pm - 11:30 pm | 11:00 pm - 11:14 pm | No |
| Braves vs. Dodgers | 9:00 pm - 12:00 am | 11:14 pm - 11:25 am | No |
| Halloween III | 10:00 pm - 12:00 am | 11:34 pm - 12:00 am | No |

(○) Rec    △ Record All    □ Sort    ◯ Done
▷ Play

Buffered Programs List

News at 11
Channel 5
Rating: N/A (Video)

(INFO) Details

| Title | Broadcast time | Time Available | Record |
|---|---|---|---|
| Fantasia | 7:00 pm - 9:00 pm | 8:50 pm - 9:00 pm | No |
| Braves vs. Dodgers | 9:00 pm - 12:00 am | 9:00 pm - 11:00 pm | No |
| News at 11 — 1322 | 11:00 pm - 11:30 pm | 11:00 pm - 11:14 pm | Yes |
| Braves vs. Dodgers | 9:00 pm - 12:00 am | 11:14 pm - 11:25 am | No |
| Halloween III | 10:00 pm - 12:00 am | 11:34 pm - 12:00 am | No |

(A) Record All  (B) Sort  (C) Done
(▷) Play  (◉) Rec

Buffered Programs List

Fantasia
Channel 2
Rating: G (INFO) Details (Video)

| Title | Broadcast time | Time Available | Record |
|---|---|---|---|
| Braves vs. Dodgers | 9:00 pm - 12:00 am | 9:00 pm - 11:00 pm | No |
| Braves vs. Dodgers | 9:00 pm - 12:00 am | 11:14 pm - 11:25 am | No |
| Fantasia | 7:00 pm - 9:00 pm | 8:50 pm - 9:00 pm | No |
| Halloween III | 10:00 pm - 12:00 am | 11:34 pm - 12:00 am | No |
| News at 11 | 11:00 pm - 11:30 pm | 11:00 pm - 11:14 pm | No |

◎ Rec  ▷ Play  △ A Record All  ▢ B Sort  ◯ C Done 1500
1306

FIG. 15A

Buffered Programs List

Braves vs. Dodgers

Channel 16

Rating: N/A (INFO) Details (Video)

| Title | Broadcast time | Time Available | Record |
|---|---|---|---|
| Fantasia | 7:00 pm - 9:00 pm | 8:50 pm - 9:00 pm | No |
| Braves vs. Dodgers | 9:00 pm - 12:00 am | 9:00 pm - 11:00 pm | No |
| Braves vs. Dodgers | 9:00 pm - 12:00 am | 11:14 pm - 11:25 am | No |
| Halloween III | 10:00 pm - 12:00 am | 11:34 pm - 12:00 am | No |
| News at 11 | 11:00 pm - 11:30 pm | 11:00 pm - 11:14 pm | No |

▷ Play   ◎ Rec   △ A Record All   ☐ B Sort   ◯ C Done

FIG. 15C

MANAGING TIME SHIFT BUFFERS

CROSS-REFERENCE TO RELATED APPLICATIONS

This application claims priority to U.S. provisional application having Ser. No. 60/290,315, filed on May 11, 2001, which is entirely incorporated herein by reference. Furthermore, this application is related to copending U.S. utility patent application entitled, "CHANNEL BUFFERING AND DISPLAY MANAGEMENT SYSTEM FOR MULTI-TUNER SET-TOP BOX", and has issued under U.S. Pat. No. 7,409,140 on Aug. 5, 2008, for which the inventors are Arturo Rodriguez and Ramesh Nallur, which is filed on even date herewith, and which is entirely incorporated herein by reference.

TECHNICAL FIELD

The invention is generally related to television systems, and, more particularly, is related to buffering video presentations.

BACKGROUND OF THE INVENTION

Subscriber television systems are now capable of providing many services in addition to analog broadcast video. In implementing enhanced programming, the home communication terminal ("HCT"), otherwise known as the settop box, has become an important computing device for accessing various video services. In addition to supporting traditional analog broadcast video functionality, digital HCTs (or "DHCTs") now also support an increasing number of two-way digital services such as video-on-demand.

A DHCT is typically connected to a cable or satellite television network and includes hardware and software for providing various services and functionality. In some systems, software executed by a DHCT can be downloaded and/or updated via the subscriber television network. The ability to download software provides flexibility in adding or updating applications executed by the DHCT. Each DHCT also typically includes a processor, communication components and memory, and is connected to a television. While many conventional DHCTs are stand-alone devices that are externally connected to a television, a DHCT and/or its functionality may be integrated into a television or other display device, as will be appreciated by those of ordinary skill in the art.

Some DHCTs include mechanisms for buffering a video presentation, including while it is being presented to a viewer. This buffering functionality allows a viewer to manipulate the video presentation using trick mode operations such as rewind, fast-forward, pause, and play. One problem with buffering functionality offered by current DHCTs is that the buffering capacity is fixed. When a viewer is presented with video presentations comprising data that exceeds the fixed buffering capacity, a portion of the previously buffered data is erased or over-written in order to accommodate the buffering of new data. For some users, the buffering capacity offered by a DHCT is more than satisfactory. However, other users may desire additional buffering capacity. For example, viewers that typically watch longer video presentations (e.g., 3 hour movies) may have a greater need for a larger buffer capacity than viewers that typically watch shorter video presentations (e.g., 30 minute sit-coms). Another problem with buffering functionality offered by DHCTs is that viewers may have different preferences regarding buffered video presentations. For example, viewers may have different preferences regarding whether buffered video presentations corresponding to previously displayed television channels should continue to be accessible after a change in television channels. Based on the foregoing, there exists a need for systems and methods that address these and/or other problems associated with buffering video presentations.

BRIEF DESCRIPTION OF THE DRAWINGS

Embodiments of the invention can be better understood with reference to the following drawings. The components in the drawings are not necessarily drawn to scale, emphasis instead being placed upon clearly illustrating the principles of the invention. In the drawings, like reference numerals designate corresponding parts throughout the several views.

FIG. 8 is a block diagram illustrating an example of a user interface (UI) screen that includes a list of television programs recorded by the DHCT depicted in FIG. 1.

FIG. 13A is a block diagram illustrating an example of a UI screen that includes a list of video presentations that are buffered by the DHCT depicted in FIG. 1.

FIG. 13B is a block diagram illustrating an example of another UI screen that includes a list of video presentations that are buffered by the DHCT depicted in FIG. 1.

FIGS. 15A, 15B, and 15C depict non-limiting examples of Sorted Buffered Programs List screens that may be requested by selecting respective options from the UI screen depicted in FIG. 14.

DETAILED DESCRIPTION OF THE PREFERRED EMBODIMENTS

The preferred embodiments of the invention now will be described more fully hereinafter with reference to the accompanying drawings. In particular, preferred embodiments of managing time-shift buffers (TSBs) will be described. A TSB comprises storage media that is used for buffering audio and/or video (A/V) data. The buffering of A/V data allows a user of a digital home communication terminal (DHCT) to perform trick mode operations on a television presentation that is currently being broadcast. Such trick mode operations may include pause, fast-rewind, fast-forward, slow-reverse, slow-forward, and/or play. In one embodiment of the invention, a user is provided with systems for managing one or more TSBs. Where more than one TSB is used in a DHCT, each TSB typically buffers A/V data that is output by a respective tuner. In one embodiment, a TSB may buffer A/V data that is received by the DHCT from a consumer electronics device such as, for example, a camcorder. The consumer electronics device may be connected to the DHCT via a wired or wireless port. In the description that follows, FIGS. 1-4 will provide an example of system components that may be used to help implement and/or manage a TSB. Furthermore, examples of methods for managing TSBs are illustrated in the flow charts of FIGS. 5-7. Finally, user interface (UI) screens that may be provided in connection with managing a TSB are illustrated in FIGS. 8-15. Note, however, that the invention may be embodied in many different forms and should not be construed as limited to the embodiments set forth herein. Furthermore, all examples given herein are intended to be non-limiting, and are provided in order to help convey the scope of the invention.

Figure 1:
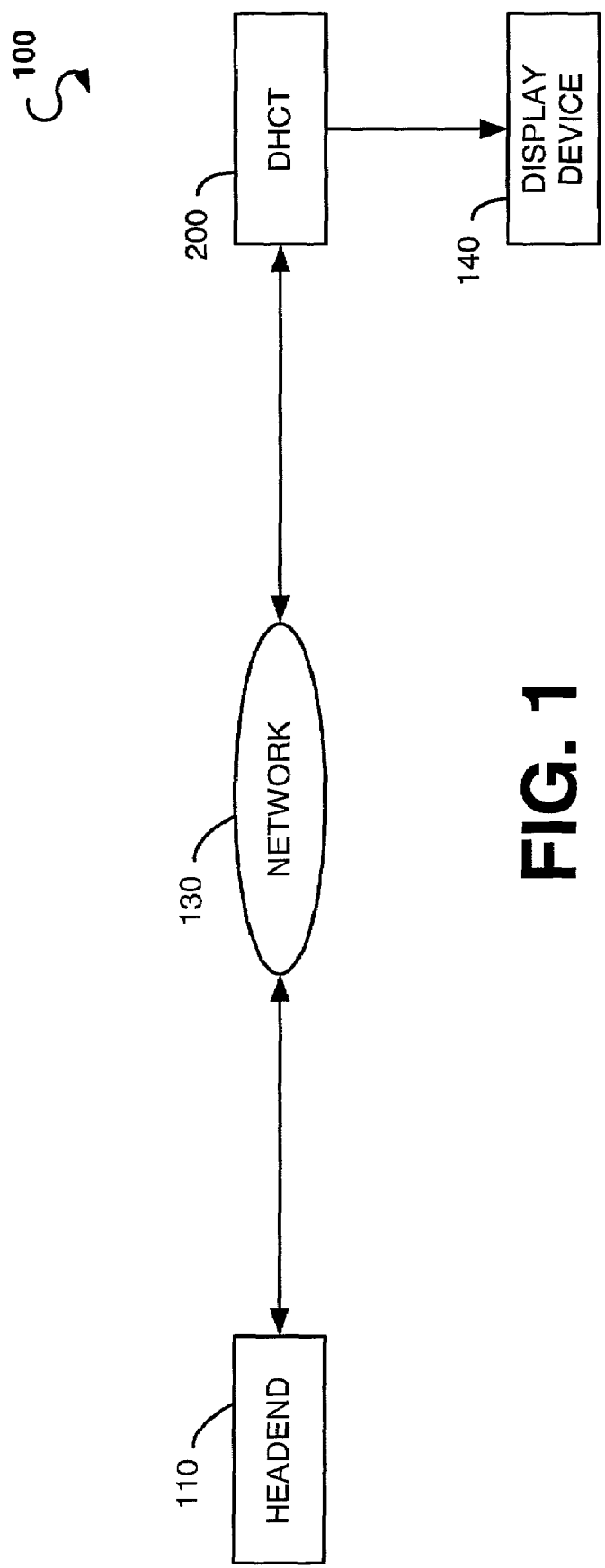
FIG. 1 is a high-level block diagram depicting an example of a subscriber television system.

FIG. 1 is a block diagram depicting a non-limiting example of a subscriber television system (STS) 100 in accordance with one embodiment of the invention. In this example, the STS 100 includes a headend 110 and a DHCT 200 that are coupled via a network 130. The DHCT 200 is typically situated at a user's residence or place of business and may be a stand-alone unit or integrated into another device such as, for example, the display device 140. The DHCT 200 receives signals (video, audio and/or other data) including, for example, MPEG-2 streams, among others, from the headend 110 through the network 130 and provides any reverse information to the headend 110 through the network 130. The network 130 may be any suitable means for communicating television services data including, for example, a cable television network or a satellite television network, among others. The headend 110 may include one or more server devices (not shown) for providing video, audio, and textual data to client devices such as the DHCT 200. The headend 110 and the DHCT 200 cooperate to provide a user with television functionality including, for example, television programs, an interactive program guide (IPG), and/or video-on-demand (VOD) presentations. The television services are provided via the display device 140. The display device 140 may be a television or any other device capable of displaying video images and/or playing any corresponding audio.

Figure 2:
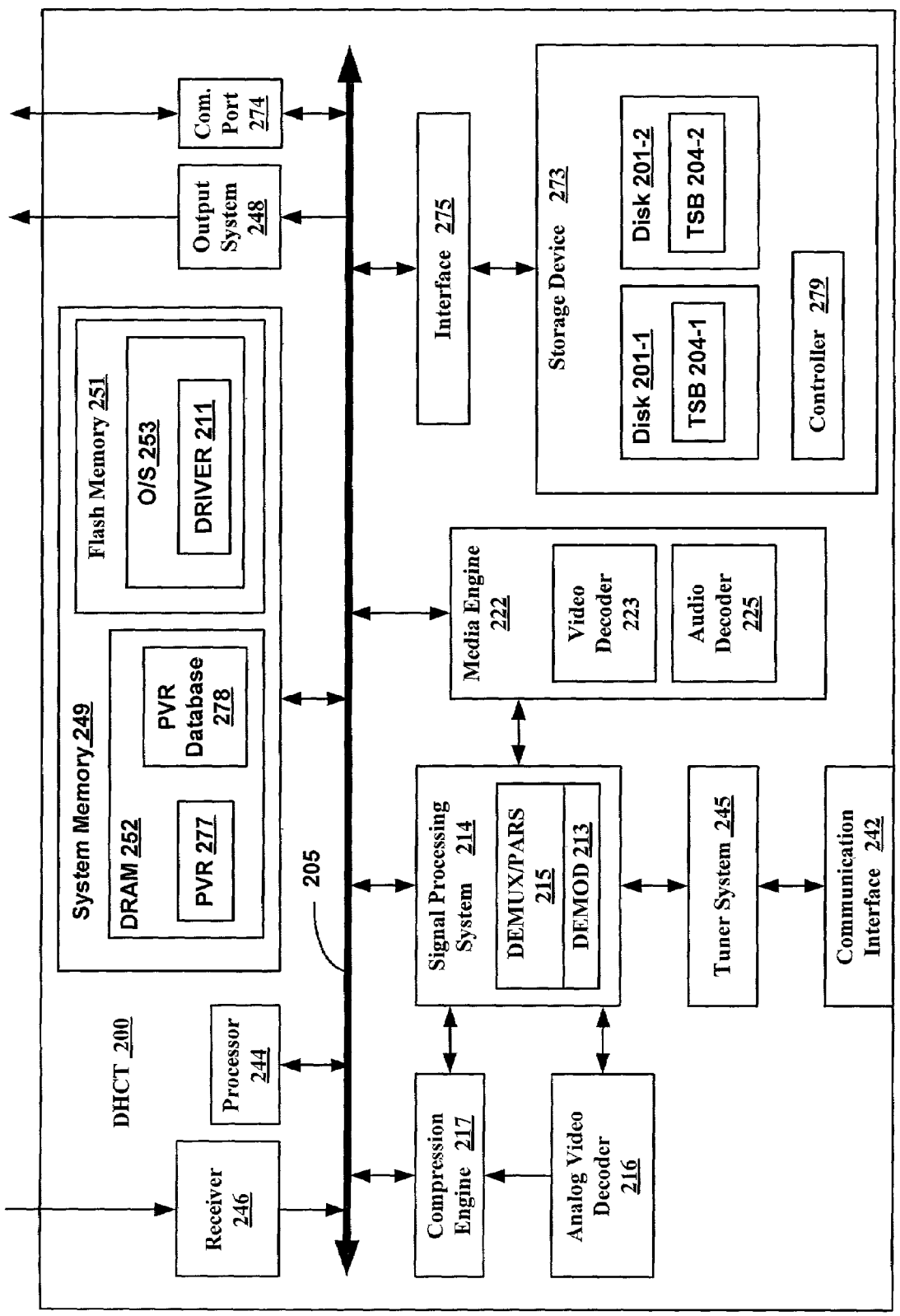
FIG. 2 is a block diagram illustrating an example of selected components of the DHCT depicted in FIG. 1 in accordance with one embodiment of the invention.

FIG. 2 is a block diagram illustrating selected components of a DHCT 200 in accordance with one embodiment of the invention. The DHCT 200 depicted in FIG. 2 is merely illustrative and should not be construed as implying any limitations upon the scope of the preferred embodiments of the invention. For example, in another embodiment, a DHCT may have fewer, additional, and/or different components than illustrated in FIG. 2. The DHCT 200 preferably includes a communications interface 242 for receiving signals (video, audio and/or other data) from the headend 110 through the network 130 (FIG. 1) and for providing any reverse information to the headend 110.

The DHCT 200 further preferably includes at least one processor 244 for controlling operations of the DHCT 200, an output system 248 for driving the display device 140, and a tuner system 245 for tuning to a particular television channel or frequency and for sending and receiving various types of data to/from the headend 110. In one embodiment, the output system 248 may be part of the media engine 222. Tuner system 245 can select from a plurality of transmission signals provided by the subscriber television system 100. Tuner system 245 enables the DHCT 200 to tune to downstream media and data transmissions, thereby allowing a user to receive digital or analog media content via the subscriber television system. The tuner system 245 includes, in one implementation, an out-of-band tuner for bi-directional quadrature phase shift keying (QPSK) data communication and a quadrature amplitude modulation (QAM) tuner (in band) for receiving television signals. In one embodiment, the tuner system 245 includes a plurality of tuners for receiving a plurality of video streams.

The DHCT 200 may include one or more wireless or wired communication ports 274 for receiving and/or transmitting data to other devices. The communication ports 274 may include a USB (Universal Serial Bus), an Ethernet, an IEEE-1394 bus, an analog video input port, a serial port, and/or a parallel port, among others. In one embodiment, the DHCT 200 may receive A/V data from a consumer electronics device such as, for example, a camcorder, via one of the communication ports 274. The DHCT 200 may also include a receiver 246 for receiving externally-generated user inputs or commands from an input device such as, for example, a remote control.

The DHCT 200 includes at least one storage device 273 for storing video streams received by the DHCT 200. A PVR application 277, in cooperation with the operating system 253 and the device driver 211, effects, among other functions, read and/or write operations to the storage device 273. Note that, references herein to write and/or read operations to/from the storage device 273, or portions thereof, will be understood to mean that such operations are performed to/from the storage medium or media (e.g., hard disks) of the storage device 273, unless indicated otherwise. The device driver 211 is a software module that preferably resides in the operating system 253. The device driver 211, under management of the operating system 253, provides operating instructions to the storage device 273. The controller 279 of the storage device 273 receives operating instructions from the device driver 211 and implements those instructions to cause read and/or write operations to a hard disk 201 (i.e., hard disk 201-1 or hard disk 201-2). Furthermore, the device driver 211, in cooperation with the operating system 253, communicates with the storage device controller 279 to format and/or manipulate a hard disk 201.

The storage device 273 is preferably coupled to a common bus 205 through a communication interface 275. The communication interface 275 is preferably an integrated drive electronics (IDE) interface or a small computer system interface (SCSI), although another interface such as, for example, IEEE-1394 or USB, among others, may be used. Alternatively, the storage device 273 can be externally connected to the DHCT 200 via a communication port 274. The communication port 274 may be, for example, an IEEE-1394, a USB, a SCSI, or an IDE, among others.

In one implementation, video streams are received in DHCT 200 via communications interface 242 and stored in a temporary memory cache. The temporary memory cache may be a designated section of DRAM 252 or an independent memory attached directly to communication interface 242. The temporary cache is implemented and managed to enable media content transfers to storage device 273. In one implementation, the fast access time and high data transfer rate characteristics of the storage device 273 enable media content to be read from the temporary cache and written to storage device 273 in a sufficiently fast manner. Multiple simultaneous data transfer operations may be implemented so that while data is being transferred from the temporary cache to storage device 273, additional data may be received and stored in the temporary cache. The storage device 273 preferably includes a hard disk drive but may, in an alternative embodiment, include any type of storage medium, such as, for example, a magnetic, optical, or semiconductor based storage medium, among others. The storage device 273 preferably includes at least two hard disks 201-1 and 201-2 that include storage capacity corresponding to respective buffers TSB 204-1 and TSB 204-2. In an alternative embodiment, TSB 204-1 and TSB 204-2 may be included on a single hard disk. In another embodiment, a TSB 204 (i.e., TSB 204-1 or TSB 204-2) may reside in more than one storage medium. In yet another embodiment, a TSB 204 may reside in a storage medium that is not a hard disk.

In one embodiment of the invention, the operating system 253, device driver 211, and controller 279 cooperate to create a file allocation table (FAT). The FAT is where the operating system 253 stores information about hard disk clusters and the files associated with those clusters. The operating system 253 can determine where a file's data is located by using FAT entries. A FAT entry describes the physical locations of data for a video stream file (i.e., a file that the video stream is written to on a hard disk 201). The FAT also keeps track of which clusters are free, or open, and thus available for use. To buffer a downloaded video stream into the storage device 273, the PVR application 277, in one preferred embodiment, creates a file and file name for the video stream to be downloaded. The operating system 253, in cooperation with the device driver 211, checks the FAT for an available, or writable, cluster for storing the video stream.

When an application such as PVR application 277 creates (or extends) a video stream file, the operating system 253, in cooperation with the device driver 211, queries the FAT for an available cluster to begin writing the video stream. The PVR application 277 (through communication with the operating system 253 and/or device driver 211) causes the controller 279 to write a downloaded video stream to the available cluster under a particular video stream file name. The FAT is then updated with the new video stream file name corresponding to the available cluster. If the video stream requires more storage space than what the cluster can offer, the operating system 253 queries the FAT for the location of another available cluster to continue writing the video stream. The FAT is updated to keep track of which clusters store a particular video stream under the given video stream file name.

A multiplicity of clusters may be required to write a file corresponding to a compressed video stream to a hard disk 201. The clusters corresponding to one particular video stream file may or may not be adjacent or contiguous in the hard disk 201. The clusters corresponding to a particular video stream file can be fragmented throughout a hard disk storage space. As described earlier, a file allocation table (FAT) keeps track of which clusters are employed to write a downloaded video stream to a hard disk 201. A defragmentation operation may be used by the device driver 211 to cause the clusters associated with a particular video stream file to be contiguous. Other preferred embodiments include other file allocation mechanism for storing data according to the functions described herein.

The DHCT 200 preferably comprises a signal processing system 214 which includes a demodulating system 213 and a transport demultiplexing and parsing system 215 (herein referred to as demultiplexing system 215). The components of signal processing system 214 are preferably capable of QAM demodulation, forward error correction, demultiplexing MPEG-2 transport streams, and parsing elementary streams. One or more of the components of the signal processing system 214 can be implemented with software, a combination of software and hardware, or preferably in hardware.

The demodulating system 213 comprises functionality for demodulating analog or digital transmission signals. For instance, demodulating system 213 can demodulate a digital transmission signal in a carrier frequency that was modulated, among others, as a QAM-modulated signal. When tuned to a carrier frequency corresponding to an analog TV signal, demultiplexing system 215 is bypassed and the demodulated analog TV signal that is output by demodulating system 213 is instead forwarded to analog video decoder 216. Analog video decoder 216 converts the analog TV signal into a sequence of digitized pictures and their respective digitized audio. The digitized pictures and respective audio that are output by analog video decoder 216 are forwarded to the compression engine 217.

The compression engine 217 processes the sequence of digitized pictures and digitized audio and converts them into compressed video and audio streams, respectively. The compressed video and audio streams are produced in accordance with the syntax and semantics of a designated audio and video coding method, such as, for example, MPEG-2, so that they can be interpreted by video decoder 223 and audio decoder 225 for decompression and reconstruction at a future time. Each compressed stream consists of a sequence of data packets containing a header and a payload. Each header contains a unique packet identification code, or PID, associated with the respective compressed stream.

The compression engine 217 multiplexes the audio and video compressed streams into a transport stream, such as, for example, an MPEG-2 transport stream. Furthermore, the compression engine 217 can compress audio and video data corresponding to multiple video streams in parallel (e.g., multiple analog TV signals received by multiple tuners) and can multiplex the respective audio and video compressed streams into a single transport stream. The compression engine 217 may use a dedicated local memory module (not shown) for storing data before, during, and/or after processing by the compression engine 217. The compressed streams output by compression engine 217 are provided as input to signal processing system 214.

The demultiplexing system 215 of the signal processing system 214 interprets sequence and picture headers and annotates their locations within their respective compressed stream. Annotating the location of sequence and picture headers facilitates the implementation of trick mode operations on a compressed stream. An analog video stream (e.g., corresponding to a TV presentation) that is received via a tuned analog transmission channel can be output as a transport stream by signal processing system 214 and stored in storage device 273. A compressed stream may be also output by signal processing system 214 and presented as input to media engine 222. The video decoder 223 and the audio decoder 225 of the media engine 222 can decompress the compressed stream for subsequent output to the display device 140 (FIG. 1).

The demultiplexing system 215 may include means for MPEG-2 transport demultiplexing. When tuned to carrier frequencies carrying a digital transmission signal, demultiplexing system 215 extracts data packets corresponding to desired video streams for further processing. Therefore, the demultiplexing system 215 may preclude further processing of data packets corresponding to unwanted video streams. The demultiplexing system 215 parses (i.e., reads and interprets) desired video streams to interpret sequence headers and picture headers, and deposits the video streams into DRAM 252. The processor 244 then causes the video streams to be transferred from DRAM 252 to the storage device 273.

A compressed video stream corresponding to a tuned carrier frequency carrying a digital transmission signal can be output as a transport stream by signal processing system 214 and stored in storage device 273. A packetized compressed stream can also be output by signal processing system 214 and presented as input to media engine 222. The video decoder 223 and/or audio decoder 223 of the media engine 222 may decompress the compressed stream for subsequent output to the display device 140.

One having ordinary skill in the art will appreciate that signal processing system 214 may include other components not shown, including memory, decryptors, samplers, digitizers (e.g., analog-to-digital converters), and multiplexers, among others. Further, other embodiments will be understood, by those having ordinary skill in the art, to be within the scope of the preferred embodiments of the invention. For example, analog signals (e.g., NTSC) may bypass one or more elements of the signal processing system 214 and may be forwarded directly to the output system 248. In addition, data that is output by one DHCT component (e.g., signal processing system 214) may be temporarily stored in DRAM 252 prior to being received as input by another DHCT component (e.g., media engine 222 or analog video decoder 216). It will also be understood by those having ordinary skill in the art that components of signal processing system 214 can be located in different areas of the DHCT 200.

In one embodiment of the invention, a plurality of tuners and respective demodulating systems 213, demultiplexing systems 215, and signal processing systems 214 may simultaneously receive and process a plurality of respective broadcast digital video streams. Alternatively, a single demodulating system 213, a single demultiplexing system 215, and a single signal processing system 214, each with sufficient processing capabilities may be used to process a plurality of digital video streams that are received by a plurality of respective tuners.

In yet another embodiment, a first tuner in tuning system 245 receives an analog video signal corresponding to a first video stream and a second tuner simultaneously receives a digital compressed stream corresponding to a second video stream. The first video stream is converted into a digital format. The second video stream (or a compressed digital version thereof) is forwarded to the storage device 273 for storage on a hard disk 201. Data annotations for each of the two streams are performed to facilitate future retrieval of the video streams from the storage device 273. The first video stream and/or the second video stream may also be forwarded to media engine 222 for decoding and subsequent presentation via display device 140 (FIG. 1).

A plurality of compression engines 217 may also be used to simultaneously compress a plurality of analog video streams. Alternatively, a single compression engine 217 with sufficient processing capabilities may be used to compress a plurality of analog video streams. Compressed digital versions of respective analog video streams may be forwarded to the storage device 273 for storage on a hard disk 201. Data annotations for each of the video streams may be performed to facilitate future retrieval of the video streams from the storage device 273. Depending on requirements in effect, only a subset of compressed video streams may be forwarded to the storage device 273. Any of the received video streams may also be simultaneously forwarded to media engine 222 for decoding and subsequent presentation via the display device 140.

Figure 3:
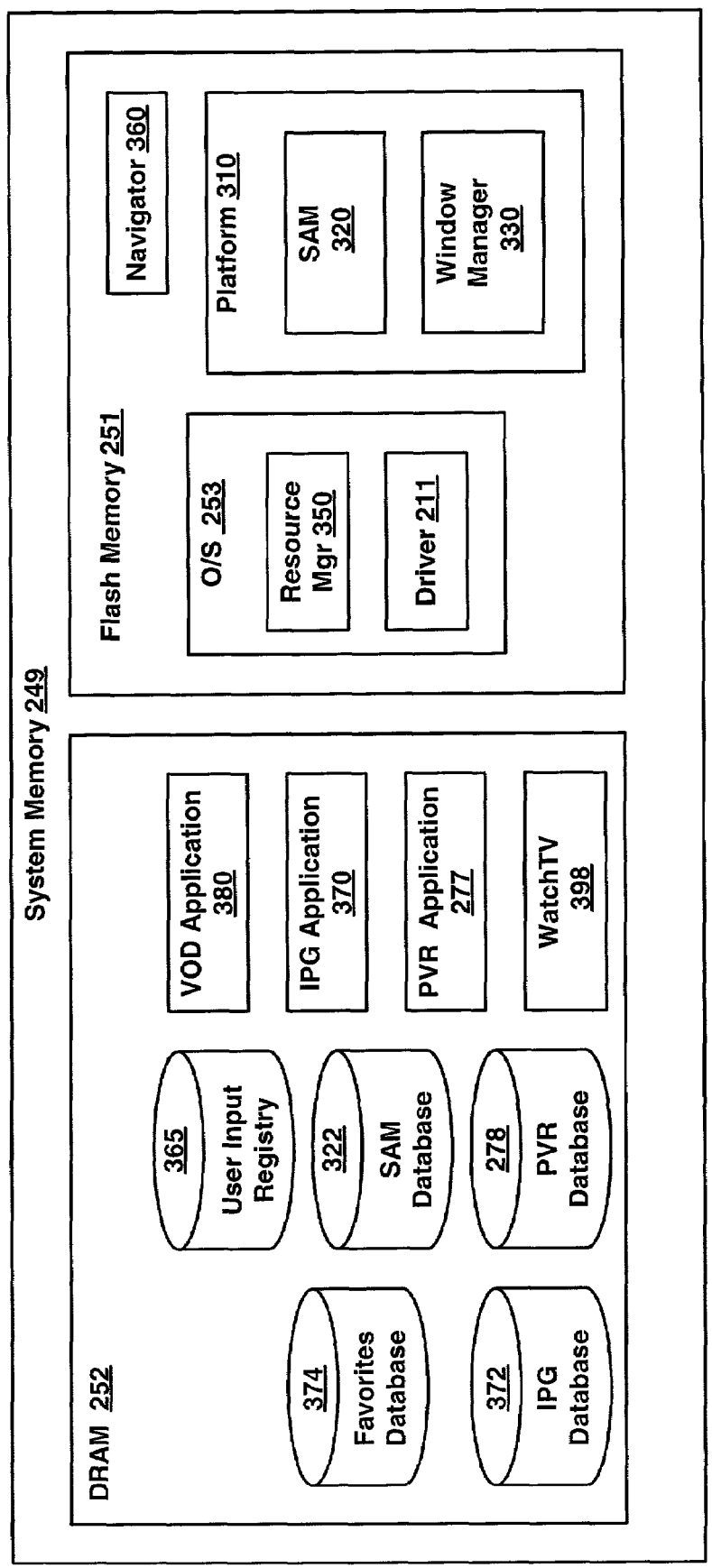
FIG. 3 is a block diagram illustrating an example of selected content of the system memory of the DHCT depicted in FIG. 2.

FIG. 3 is a block diagram illustrating selected components stored in the system memory 249 of the DHCT 200 (FIG. 2), in accordance with one preferred embodiment. The system memory 249 described herein is merely illustrative and should not be construed as implying any limitations upon the scope of the invention. In one implementation, system memory 249 includes flash memory 251 and dynamic random access memory (DRAM) 252 for storing various applications, modules and data for execution and use by the processor 244. In an alternative embodiment, system memory 249 may include additional, fewer, and/or different types of memory.

Basic functionality of the DHCT 200 is provided by an operating system 253 that is primarily stored in flash memory 251. The operating system 253 includes at least one resource manager 350 that provides an interface to and coordination of resources of the DHCT 200 such as, for example, computing resources. One or more software applications, herein referred to as applications, are executed by utilizing the computing resources in the DHCT 200. Applications stored in flash memory 251 or DRAM 252 are executed by processor 244 under the auspices of the operating system 253. Data required as input by an application is stored in DRAM 252 or flash memory 251 and read by processor 244 as needed during the course of the application's execution. Input data may be data stored in DRAM 252 by a secondary application or other source, either internal or external to the DHCT 200. Data generated by an application is stored in DRAM 252 by processor 244 during the course of the application's execution.

An application referred to as navigator 360 is also resident in flash memory 251 for providing a navigation framework for services provided by the DHCT 200. The navigator 360 registers for and in some cases reserves certain user inputs related to remote control keys such as channel up/down, last channel, favorite channel, etc. A platform library 310 includes a collection of utilities useful to applications. Such utilities may include a timer manager, a compression manager, an HTML parser, a database manager, a widget toolkit, a string manager, and other utilities (not shown). These utilities are accessed by applications via application programming interfaces (APIs) as necessary so that each application does not have to incorporate these utilities. Two components of the platform library 310 that are depicted in FIG. 3 are a window manager 330 and a service application manager (SAM) client 320.

The window manager 330 provides a mechanism for implementing the sharing of the screen regions and user input. The window manager 330 is also responsible for, as directed by one or more applications, implementing the creation, display, and allocation of the limited DHCT 200 screen resources. The window manager 330 allows multiple applications to share the screen by assigning ownership of screen regions. The window manager 330 communicates with resource manager 350 to coordinate available resources (such as display memory) among different resource-consuming processes. Such processes may be directly or indirectly invoked by one or more applications.

The window manager 330 also maintains, among other things, a user input registry 365 in DRAM 252. The user input registry 365 may be accessed to determine which of various applications running on the DHCT 200 should receive data corresponding to a user input, and in which order. As an application is executed, it registers a request to receive certain user input keys or commands. When the user presses a key corresponding to one of the commands on the remote control device, the command is received by the receiver 246 and relayed to the processor 244. The processor 244 dispatches the event to the operating system 253 where it is forwarded to the window manager 330. The window manager 330 then accesses the user input registry 365 and routes data corresponding to the incoming command to the appropriate application.

The SAM client 320 is a client component of a client-server system, with the server component being located on the headend 110 (FIG. 1). A SAM database 322 in DRAM 252 includes a data structure of services that are created and updated by the headend 110. Many television services can be defined using the same application component, with different parameters. Television services may include, without limitation and in accordance with one implementation, the presentation of television broadcast programs, video-on-demand (VOD), music, and/or an interactive program guide (IPG). In general, the identification of a service includes the identification of an executable application that provides the service along with a set of application-dependent parameters that indicate to the application the service to be provided. As a non-limiting example, a service of presenting a television program could be executed with a set of parameters to view HBO or with a separate set of parameters to view CNN. Each association of the application component (e.g., watchTV 398) and one parameter component (HBO or CNN) represents a particular service that has a unique service I.D.

Applications can be downloaded into DRAM 252 at the request of the SAM client 320, typically in response to a request by the user or in response to a message from the headend. In this non-limiting example, DRAM 252 contains a PVR application 277, an interactive program guide (IPG) application 370, and a video-on-demand (VOD) application 380. It should be clear to one with ordinary skill in the art that these applications are not limiting and merely serve as examples for this present embodiment of the invention. Furthermore, one or more DRAM 252 based applications may, as an alternative embodiment, be resident in flash memory 251, or vice versa.

The PVR application 277 provides user interface (UI) screens that assist the user in buffering, recording, and viewing video presentations. For instance, the PVR application 277 may be configured to provide the user with the UI screens depicted in FIGS. 8-15. As used herein, a video presentation may be a television presentation such as, for example, a movie, a television show, a cartoon, a news program, a sports program, or a series episode, among others. A video presentation may be received as a broadcast A/V signal or may be downloaded interactively via the tuner system 245. A video signal may also be received via one of the communication ports 274 from a consumer electronics device such as, for example, a camcorder, a VCR, or a DVD player. The PVR application 277 may be implemented in hardware, software, firmware, or a combination thereof.

In a preferred embodiment, the PVR application 277 is implemented in software that is stored in a DRAM 252 and that is executed by processor 244. The PVR application 277, which may comprise an ordered listing of executable instructions for implementing logical functions, may be embodied in any computer-readable medium for use by or in connection with an instruction execution system, apparatus, or device, such as a computer-based system, a processor-containing system, or another system that can fetch instructions from the instruction execution system, apparatus, or device and execute them.

The PVR application 277 provides for A/V data storage functionality by enabling the temporary writing to, and if requested, long-term recording to the storage device 273. Through mechanisms explained below, A/V data is buffered in a TSB 204 (i.e., TSB 204-1 or TSB 204-2). In accordance with a preferred embodiment, the PVR application 277 manages a TSB 204 at the application level for each tuner and/or a local device providing A/V data. Hence, each tuner in tuner system 245 and/or local device attached to the DHCT 200 may have a respective TSB 204. Data that is buffered in a TSB 204 may have been received from a remote server via the subscriber television network 130 (FIG. 1), from a local device via a home communication network, or from a consumer device such as, for example, a video camera that is directly connected to the DHCT 200.

The A/V data buffered in a TSB 204 may be retained (in response to user input) as a long-term recording or may be deleted as additional A/V data is buffered. The A/V data buffered in a TSB 204 may be deleted by, for example, deleting a TSB management file associated with the data and/or by designating the clusters storing the A/V data as writable (for eventual write operations that overwrite the A/V data within those clusters).

A long-term recording will be understood to comprise A/V data that is stored for an extended period of time as determined by the user. Long-term recordings are stored in clusters that are not assigned to a TSB 204. A long-term recording may be scheduled in advance of its broadcast time or may be achieved by selecting a video presentation buffered in a TSB 204 and designating it as a long-term recording. As will be described below, designating a video presentation as a long term recording can occur, in one implementation, by receiving user input selecting the video presentation from a list provided via a UI screen. The PVR application 277 responds by "flagging" the associated TSB management file as corresponding to a long-term recording. The designation of a video presentation as a long-term recording is relayed to the device driver 211 which may effect the removal of the clusters containing the video presentation from a TSB 204. In one embodiment, the removal of clusters containing the video presentation from a TSB 204 may be implemented by associating the clusters with a file corresponding to the long-term recording, and by replenishing the TSB 204 with an equal number of clusters from a pool of available clusters. A long-term recording may eventually be deleted from the storage device 273 in response to, for example, a user request. This deletion occurs, in one implementation, by configuring the associated non-buffer clusters as writable, and thus eventually available for the buffering or recording of other A/V data. In an alternative embodiment, a buffered video presentation that is designated as a long term recording may be copied from a TSB 204 to another portion of a hard disk 201 for long term storage.

In one implementation, applications executing on the DHCT 200 work with the navigator 360 by abiding by several guidelines. First, an application utilizes the SAM client 320 for the provision, activation, and suspension of services. Second, an application shares DHCT 200 resources with other applications and abides by the resource management policies of the SAM client 320, the operating system 253, and the DHCT 200. Third, an application conforms to situations where shared resources are only accessible via the navigator 360. Fourth, when an application loses service authorization while providing a service, the application suspends the service via the SAM client 320. The navigator 360 may reactivate an individual service application when it later becomes authorized. Finally, an application client is designed to not have access to commands corresponding to certain user input keys reserved by the navigator 360 (e.g., power, channel +/−, volume +/−, etc.).

Data and software used in providing a DHCT service to a user may be stored in one or more of the following memory resources: a data storage device located at a headend, a data storage device located at a customer premises, a volatile or non-volatile memory internal to the DHCT 200, and/or a hard drive internal to the DHCT 200. For example, an executable program or algorithm corresponding to an operating system (OS) component, or to a client platform component, or to a client application (e.g., PVR application 277), or to respective parts thereof, may reside in and/or execute out of DRAM 252 and/or flash memory 251. An executable program or algorithm may also reside in a storage device 273 and/or an external storage device and may be transferred into DRAM 252 for execution. Likewise, data input and/or output for an executable program or algorithm may be stored in DRAM 252, in flash memory 251, in storage device 273, and/or in a storage device connected to the DHCT 200.

Figure 4:
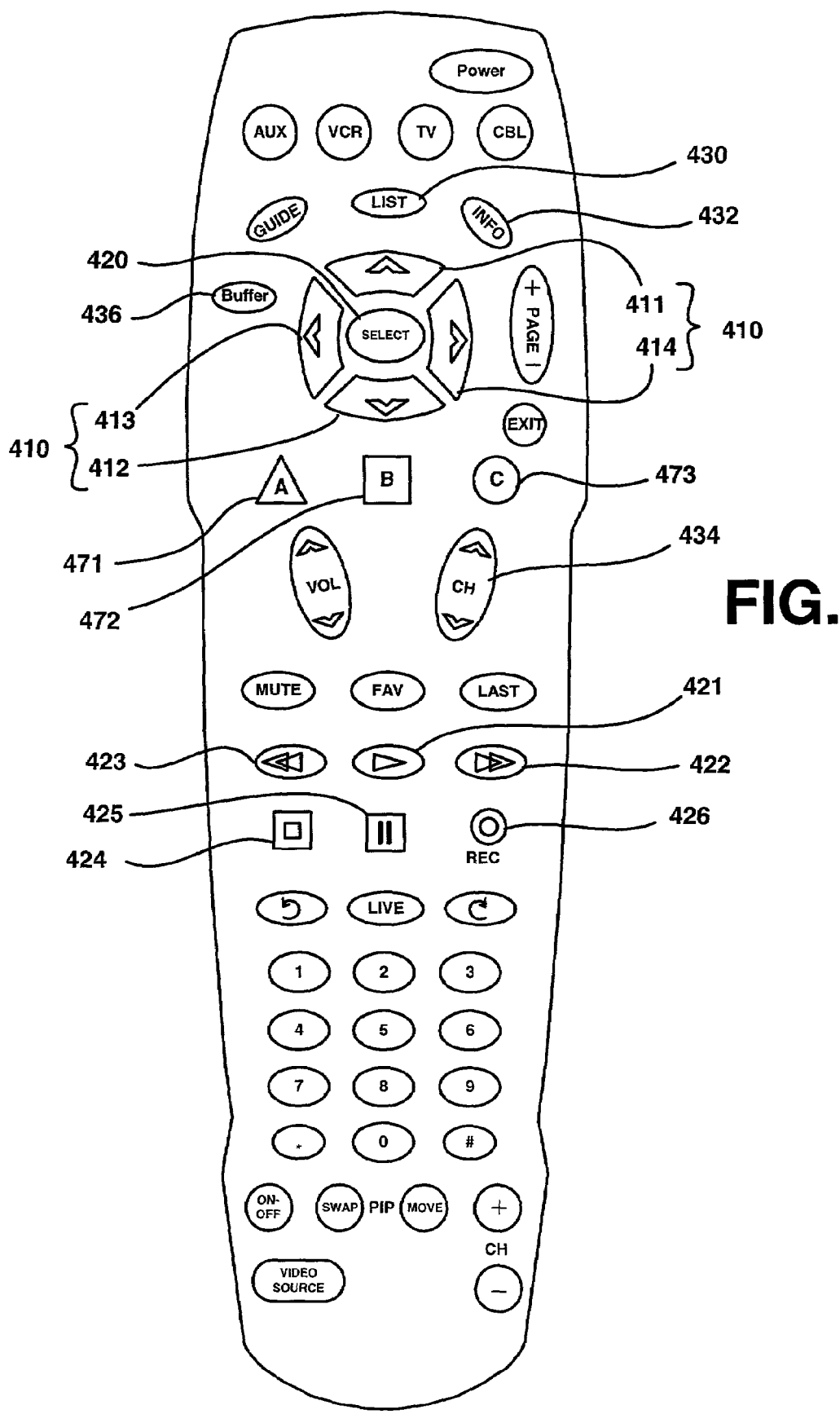
FIG. 4 is a block diagram illustrating an example of a remote control that may be used to provide user input to the DHCT depicted in FIG. 2.

FIG. 4 depicts a non-limiting example of a remote control device 400 that may be used to provide user input to the DHCT 200. The remote control device 400 described herein is merely illustrative and should not be construed as implying any limitations upon the scope of the invention. Four arrow keys 410 are provided including an up arrow key 411, a down arrow key 412, a left arrow key 413, and a right arrow key 414. The arrow keys 410 can be used to scroll through on-screen options and/or to highlight an on-screen option. A select key 420 may be used to select a currently highlighted option.

Figure 9:
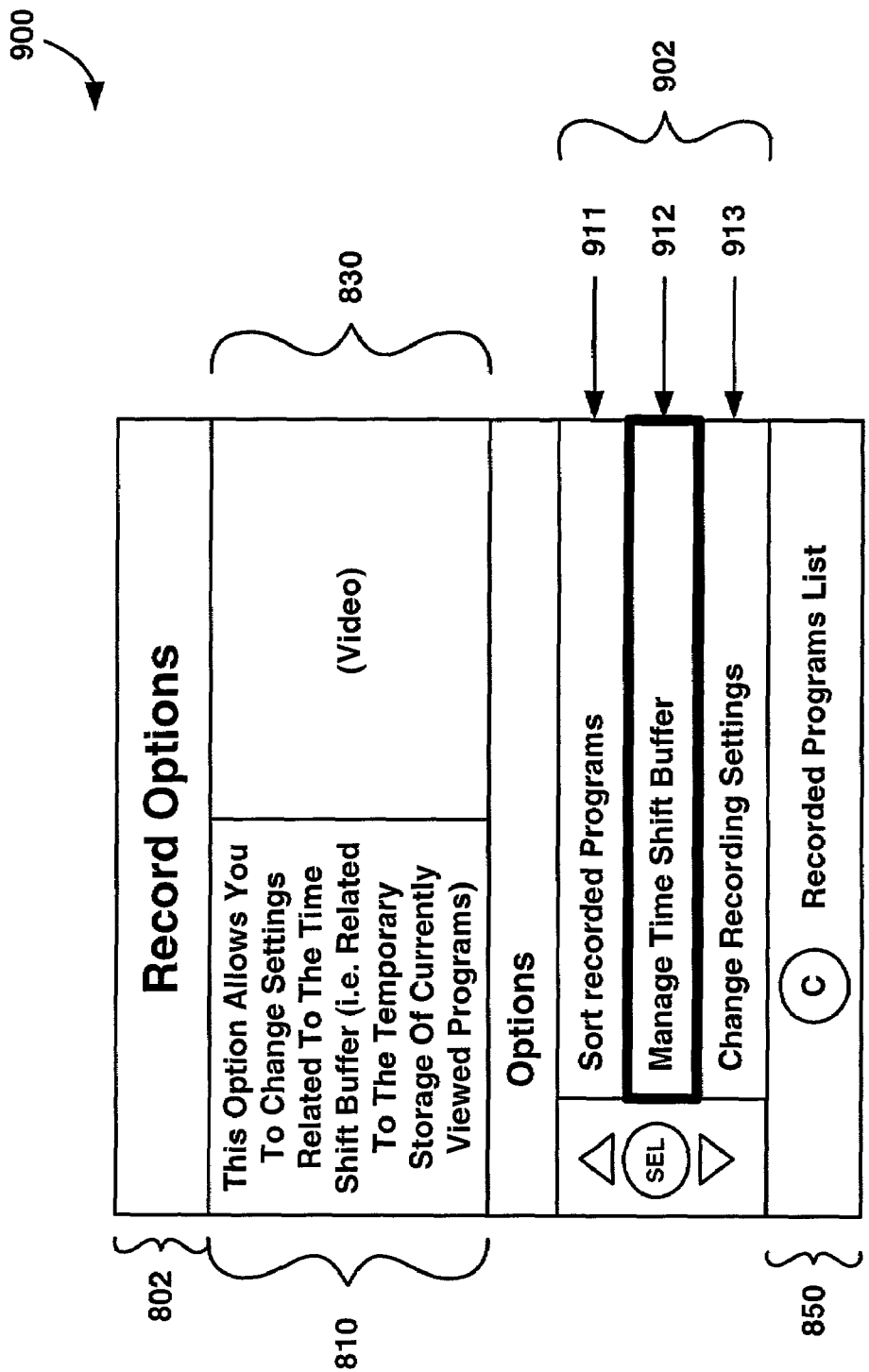
FIG. 9 is a block diagram illustrating an example of a UI screen that includes a list of recording and buffering options provided by the DHCT depicted in FIG. 1.

The functions of an "A" key 471, a "B" key 472, and a "C" key 473 may vary depending on the UI screen being presented to a user at the time of the key's activation. For instance, when the UI screen illustrated in FIG. 9 is presented to a user, the "C" key 473 may be used to request a previously displayed UI screen. Other remote control keys may function as follows: a List key 430 may be used to request a list of video recordings that are stored in storage device 273; an Info key 432 may be used to request additional information regarding a video presentation; and video control keys 421-426 may be used to control a VCR and/or to request PVR functionality such as play (421), fast-forward (422), rewind (423), stop (424), pause (425), and record (426).

Figure 5:
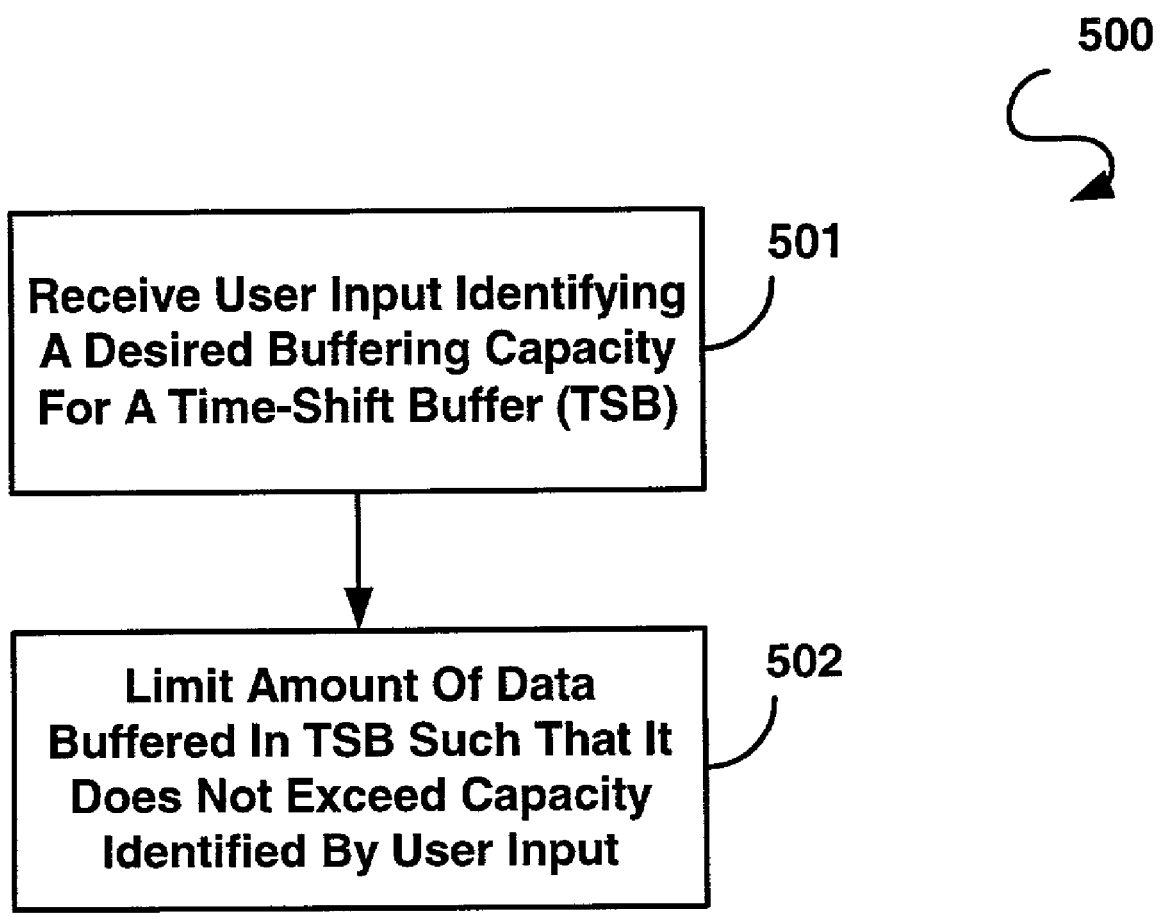
FIG. 5 is a flow chart illustrating an example of a method for managing the buffering capacity of the DHCT depicted in FIG. 1.

FIG. 5 is a flow chart illustrating a method for managing the buffering capacity of the DHCT 200 (FIG. 1). In step 501, the DHCT 200 receives user input identifying a desired buffering capacity for a TSB 204. As in other examples discussed below, a user input may be received via, for example, a remote control device, and may correspond to an option that is displayed via a UI screen. The desired buffering capacity is preferably identified in terms of the play-time of the buffered A/V data. For example, a user may be able to select a one-hour buffering capacity if the user desires the ability to access up to one hour of buffered video presentations. In another embodiment, the buffering capacity may be identified in terms of a number of data units (e.g., bytes) that may be buffered in a TSB 204. In yet another embodiment, buffering capacities for more than one TSB 204 may be identified by user input.

After the user identifies a desired buffering capacity for a TSB 204, the amount of data that is buffered in a TSB 204 is limited (as indicated in step 502) such that it does not, or substantially does not, exceed the capacity that is identified by the user input. One approach for limiting the amount of data that is buffered in a TSB 204 is to assign to the TSB a storage capacity (e.g., a certain number of clusters) that corresponds to the user selected buffering capacity. A buffering capacity that is identified in terms of a play-time may be implemented based on an estimated number of data units that typically provide such play-time. For example, if a user identifies a desired TSB capacity as one-hour, then the storage capacity that is assigned to a TSB 204 may be limited to a predetermined number of bytes that is estimated to provide an average play-time of one-hour.

More than one approach may be used to manage a TSB 204 after a certain storage capacity has been allocated to it. In one implementation, after the TSB is full of buffered data, then additional data being buffered in the TSB is written over previously buffered data. The previously buffered data that is over-written is preferably, but not necessarily, data that had been residing in the TSB for the longest duration as compared to other TSB content. In another implementation, after the TSB is full of buffered data, then a portion of the storage capacity allocated to the TSB is de-allocated from the TSB, and additional storage capacity that is equivalent to the de-allocated portion is assigned to the TSB to accommodate additional data buffering. The portion of storage capacity that is de-allocated from the TSB preferably, but not necessarily, contains data that had been residing in the TSB for the longest duration as compared to other TSB content.

The PVR application 277 may be used to help maintain a user defined storage capacity for a TSB 204. In a preferred embodiment, the storage capacity of a TSB 204 corresponds to a portion of a hard disk 201. If storage capacity is defined based on a desired play time, then a corresponding data unit capacity (e.g., in terms of bytes) may be determined based on an estimated data rate. For example, if a user selects a TSB storage capacity corresponding to 3 hours of play time, then assuming a constant bit rate of 2 mega bits per second (Mbps), the PVR application 277 may assign 0.9 gigabytes (GB) of storage capacity to the TSB 204.

The PVR application 277 may track available disk space and use it to maintain the TSB storage capacity at a desired level. For example, before the PVR application 277 effects a write operation to a TSB 204, it can query the device driver 211 (through the operating system 253) to determine available hard disk space. After a write operation, the PVR application 277 can again poll the device driver 211 to get an update on available hard disk space.

A TSB 204 preferably comprises a plurality of clusters. The total storage capacity of the TSB clusters, at any one tine, may be less than or greater than the user-defined TSB storage capacity because of variations in the bit-rate within a video stream and between video streams that are stored in a TSB 204. The variations, if any, of the amount of clusters in a TSB 204 will preferably represent a small percentage of the TSB capacity, thereby resulting in a substantially constant TSB size over time.

The PVR application 277 preferably manages a TSB 204 by creating a TSB management file associated with each buffered video presentation. A buffered video presentation may include an entire broadcast video presentation or only a portion thereof. For example, if the video presentation Friends is broadcast from 8:00 p.m. to 8:30 p.m., then the buffered video presentation of Friends may only include the portion that was broadcast between 8:15 and 8:30 p.m. The PVR application 277 determines at what time the video presentation was tuned based on a real-time clock value that is forwarded by the operating system 253. The PVR application 277 also receives program guide data from, for example, an IPG application 370 (FIG. 3). The program guide data may include start and end times of each video presentation and may be received by the IPG application 370 from the headend 110. The PVR application 277 may use the program guide data and the values from a real-time clock to create TSB management files for tracking respective buffered video presentations. The TSB management files may also be used to provide a UI screen that includes a list of video presentations currently stored in a TSB 204. In one embodiment, a TSB management file, which may be stored in DRAM 252, can include program guide data (e.g., title and broadcast time) as well as data representing the beginning and end time of buffered portions of video presentations.

Figure 6:
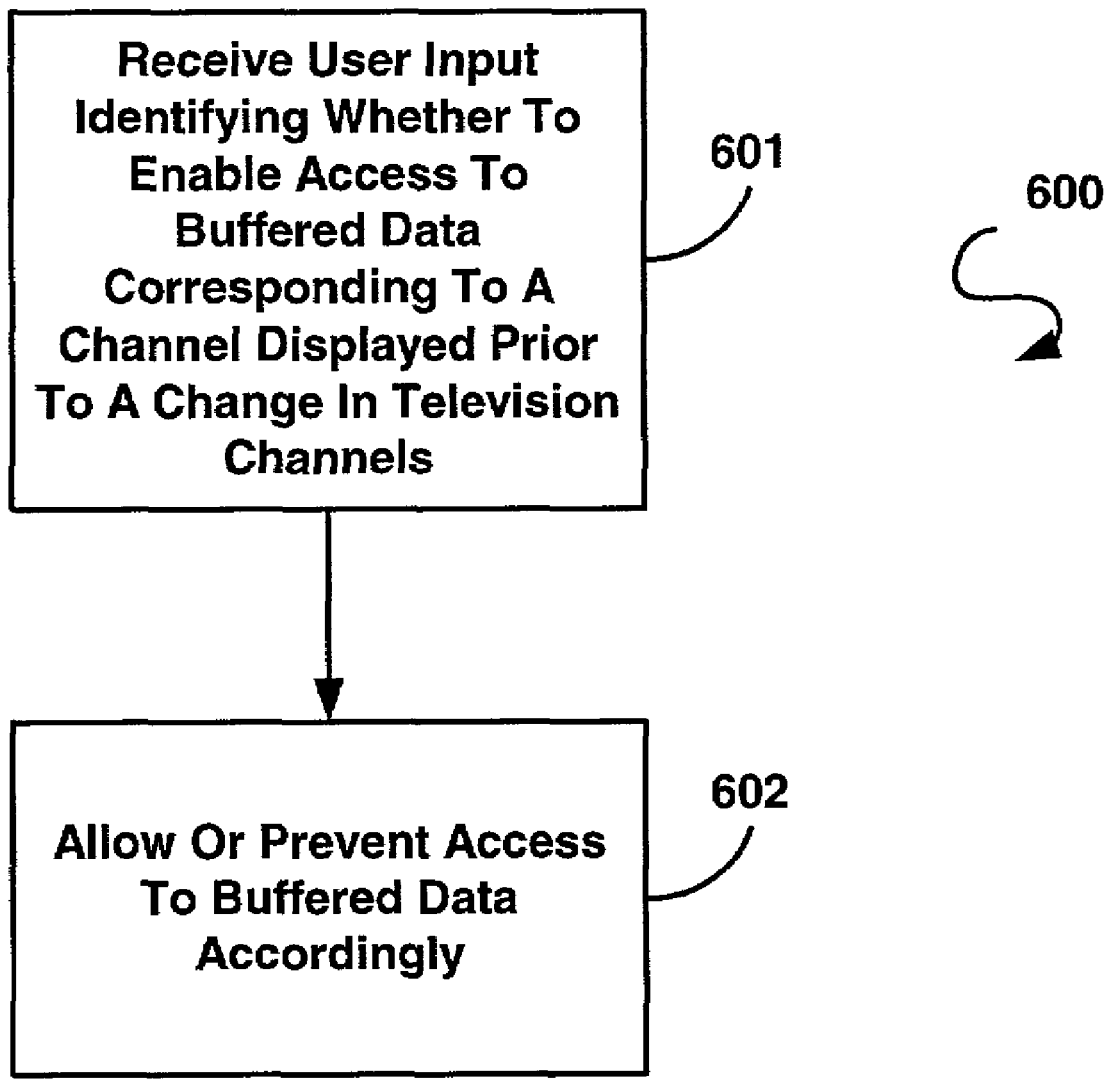
FIG. 6 is a flow chart illustrating an example of a method for managing buffering functionality of the DHCT depicted in FIG. 1.

FIG. 6 is a flow chart illustrating a method for managing buffering functionality of the DHCT 200. In step 601, the DHCT 200 receives user input identifying whether to enable access to buffered data corresponding to a TV channel that was displayed prior to a change in TV channels (i.e., whether to enable access to prior-channel buffered data). Then in step 602, access to prior-channel buffered data is enabled or disabled accordingly.

When access to prior-channel buffered data is enabled, then a user may have access to buffered video presentations corresponding to two or more respective television channels that are displayed to the user as a result of one or more channel changes. In one implementation, a video presentation is only buffered and/or accessible if the corresponding television channel is presented to a user for more than a predetermined time period. In one embodiment, this predetermined time period may be specified by user input.

As a non-limiting example, assume that a user requests that access to prior-channel buffered data be enabled, and that the user subsequently watches the video presentation Friends on channel 11. Then, in such a scenario, after the user effects a change of the displayed television channel from channel 11 to channel 12, the user will still be able to review the portion of Friends that was displayed on channel 11 prior to the change to channel 12. In other words, data that is buffered prior to a change in channels is not deleted or otherwise rendered inaccessible.

If a user requests that access to a prior-channel buffered data be disabled, then buffered video presentations corresponding to a prior channel are deleted and/or rendered inaccessible. A video presentation may be rendered inaccessible by, for example, deleting a corresponding TSB management file and/or by setting a flag that identifies the video presentation as inaccessible.

In another embodiment, a user may press a certain remote control key (e.g., the buffer key 436 or the record key 426, FIG. 4) within a short time interval (e.g., 2 seconds) prior to invoking a change in TV channels (e.g., via the channel +/− key 434) in order to cause a TV channel being currently viewed to continue being buffered in a TSB 204 after the change in TV channels is implemented. In this manner a user is provided with a quick method for activating inter-channel buffering. The activation of inter-channel buffering via a certain remote control key may be enabled or disabled by a user via an interactive configuration session (e.g., by selecting a corresponding option via a UI screen).

Figure 7:
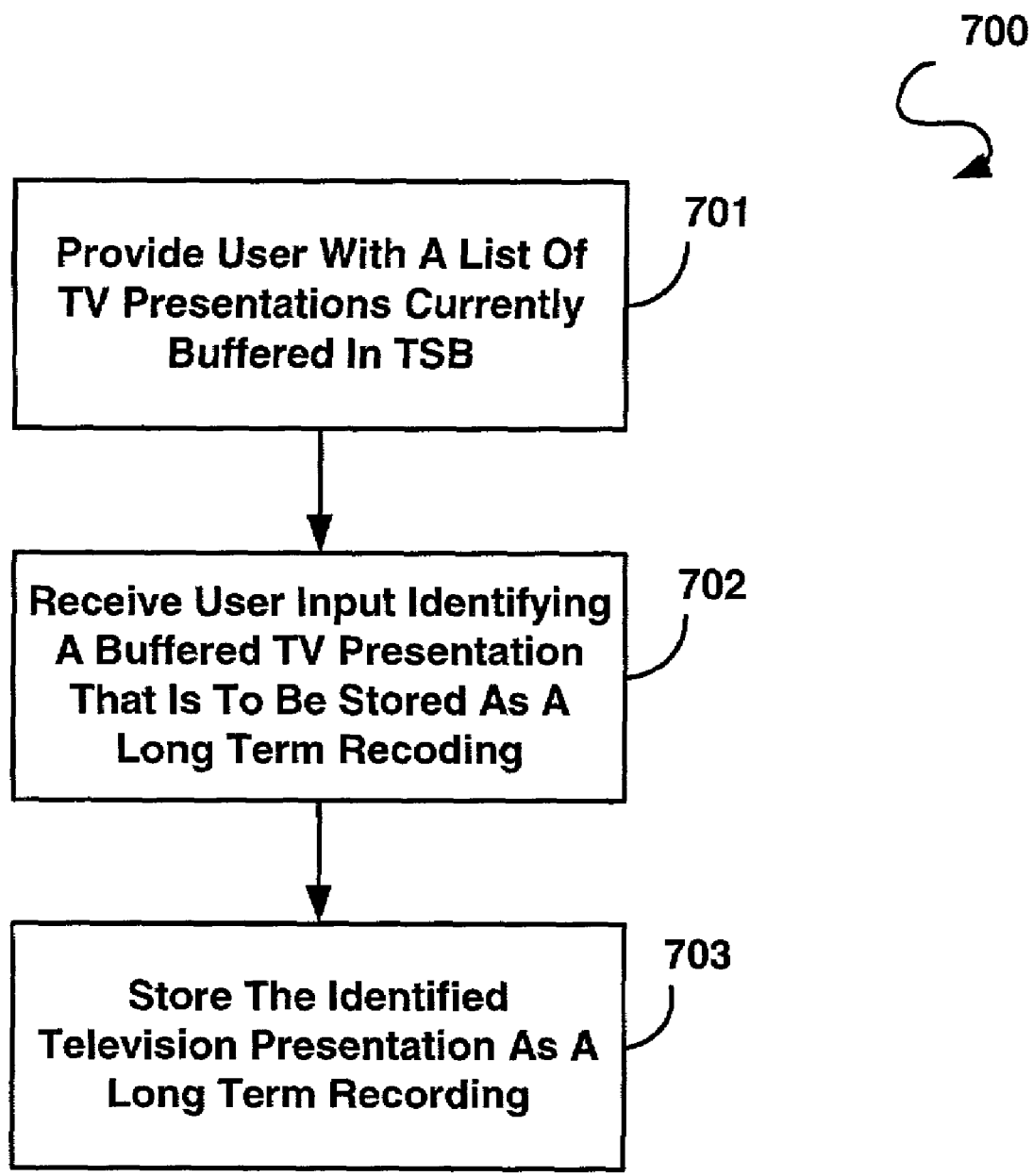
FIG. 7 is a flow chart illustrating an example of a method for recording a buffered video presentation by the DHCT depicted in FIG. 1.

FIG. 7 is a flow chart illustrating a method for recording a buffered video presentation by the DHCT 200 (FIG. 1). In step 701, the DHCT 200 provides a user with a list of buffered video presentations. Each buffered video presentation may correspond to either an entire video presentation (e.g., a movie, a show, a cartoon, a series episode, etc.) or a portion thereof. In step 702, the DHCT 200 receives user input identifying a buffered video presentation that is to be stored as a long-term recording. A long-term recording is a recording that will likely remain stored in the DHCT 200 until it is expressly deleted pursuant to a user instruction or until it is over-written by a user scheduled recording.

After the DHCT 200 receives user input identifying a buffered video presentation that is to be stored as a long-term recording, the DHCT 200 stores the buffered video presentation as a long-term recording (as indicated in step 703). One approach for storing a buffered video presentation as a long-term recording is to set a flag in a corresponding TSB management file identifying the video presentation as such, and to designate the storage space containing the buffered video presentation as not corresponding to a TSB 204 (i.e., to de-allocate the storage space from a TSB 240-i). Additional storage space having a capacity equal to the size of the de-allocated storage space may be allocated to the TSB 204 to maintain a desired buffering capacity. In another embodiment, a video presentation that is buffered in a TSB 204 may be converted to a long-term recording by being copied to another portion of a hard disk 201.

FIG. 8 depicts a non-limiting example of a Recorded Programs List (RPL) screen 800 that contains a list of recorded video presentations. The RPL screen 800 may be presented by PVR application 277 in response to user input that may be provided via, for example, the activation of the List key 430 (FIG. 4). The PVR application 277 may retrieve information from a PVR database 278, as needed, for presentation via the RPL screen 800. Furthermore, as in other UI screens, the PVR application 277 may work in cooperation with window manager 330 to present a user with a UI screen that is formatted in accordance with configuration data that is stored in DRAM 252.

A recorded programs list 860 contains recording entries corresponding to recorded video presentations. Each recording entry in the recorded programs list 860 includes information such as the title of a recorded video presentation, the date it was recorded, the start time of the recording, and the length (i.e., play time) of the recording. In one embodiment, the arrow keys 410 (FIG. 4) can be used to scroll through the recorded programs list 860 and to highlight a desired recording entry.

The heading area 802 contains a heading for the RPL screen 800. In this example, the heading area contains the heading "Recorded Programs List." The bottom area 850 of RPL screen 800 contains information about the current functions of relevant keys on the remote control device 400 (FIG. 4). As suggested in bottom area 850, the play key 421 may be used to request the playing of a video presentation corresponding to a currently highlighted recording entry, the "B" key 472 may be used to request recording options, and the "C" key 473 may be used to request a recording schedule.

Video corresponding to the television channel to which the DHCT 200 is currently tuned (for which audio may also be playing, and which typically corresponds to a video presentation occupying the full screen before the user is presented with RPL screen 800) is displayed in a video area 830. Next to the video area 830 is a detailed focus area 810 that includes detailed information for a currently highlighted recording entry 820. In the current example, the currently highlighted recording entry 820 corresponds to the video presentation title JAG 822. The detailed focus area 810 may include information such as the title of the video presentation (e.g., JAG), the quality of the recording (e.g., Good), the anticipated end of the recording duration (e.g., until erased). A user may request additional information by activating the Info key 432 on the remote control device 400.

In one embodiment, the detailed focus 810 area may include an icon or a letter (e.g., A or D) to indicate whether the video presentation was received as an analog or digital signal. Furthermore, the PVR application 277 (FIG. 2) may identify a quality of a recording to a user based on a parameter that was employed by the compression engine 217 in compressing an analog signal or based on a bit-rate of a received digital signal.

FIG. 9 depicts a non-limiting example of a Record Options screen 900 that contains a list of options 902 related to the recording and/or buffering and of video presentations. A user may request the Record Options screen 900 by, for example, activating the "B" key 472 (FIG. 4) while being presented with the RPL screen 800 (FIG. 8). In this example, the list of options 902 includes an option 911 to sort recorded programs, an option 912 to manage a time shift buffer, and an option 913 to change recording settings. As suggested in the bottom area 850, the user may activate the "C" key 473 (FIG. 4) in order to return to the previously displayed screen (e.g., the RPL screen 800). The detailed focus area 810 provides information related to the currently highlighted option 912. In an alternative embodiment, a Record Options screen 900 does not include the video area 830 or the detailed focus area 810, and/or is presented as a barker that overlays a preceding screen (e.g., the RPL screen 800).

Figure 10:
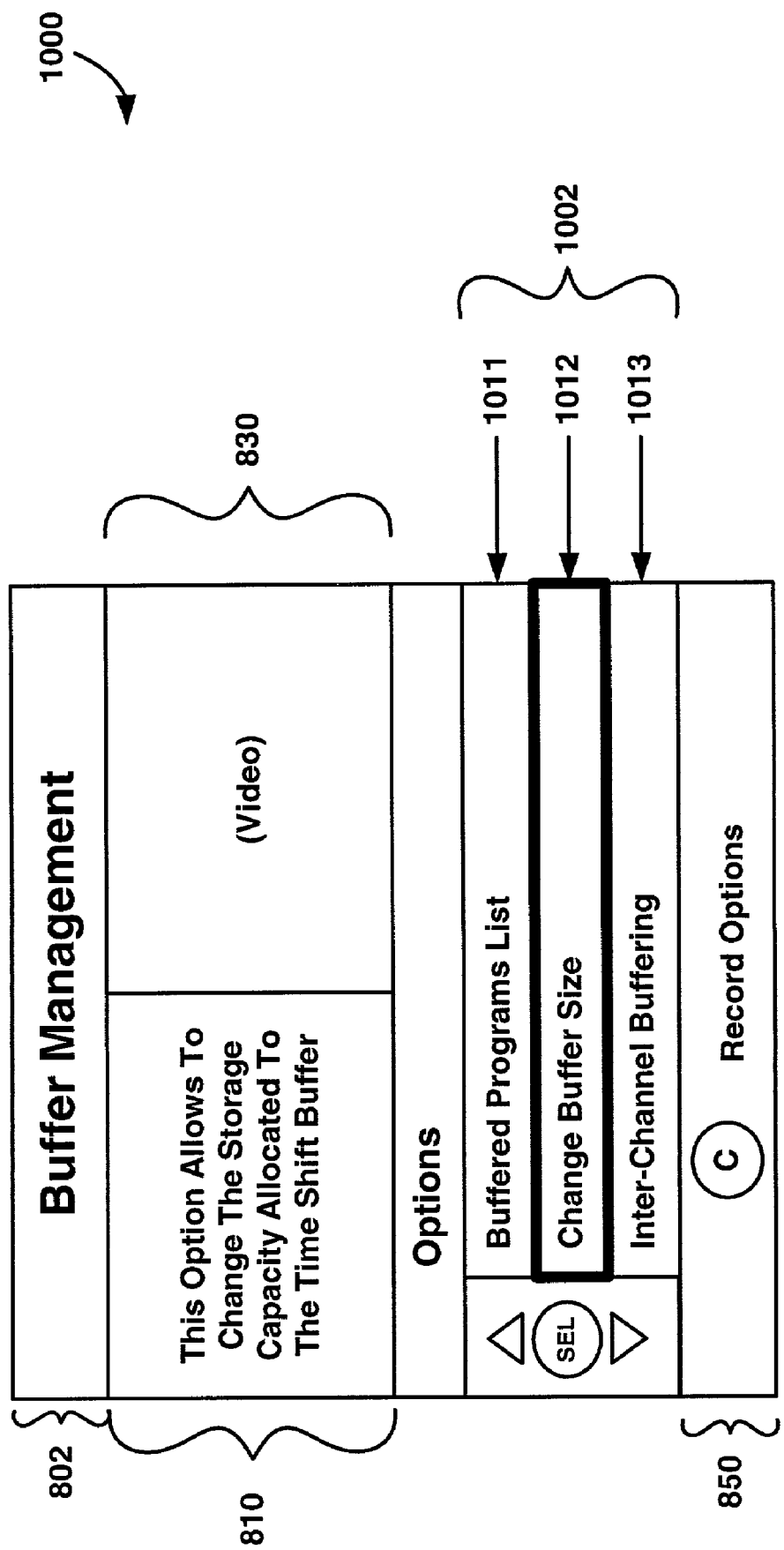
FIG. 10 is a block diagram illustrating an example of a UI screen that includes a list of buffer management options provided by the DHCT depicted in FIG. 1.

FIG. 10 depicts a non-limiting example of a Buffer Management screen 1000 that contains a list of options 1002 related to the buffering of video presentations. A user may request the Buffer Management screen 1000 by, for example, selecting option 912 while being presented with the Record Options screen 900 (FIG. 9). Alternatively, the Buffer Management screen 1000 may be requested via the activation of a dedicated key on a remote control device. In this example, the list of options 1002 includes an option 1011 to view a list of buffered programs, an option 1012 to manage a time shift buffer, and an option 1013 related to inter-channel buffering. These options 1011-1013 will be discussed in more detail below.

Figure 11:
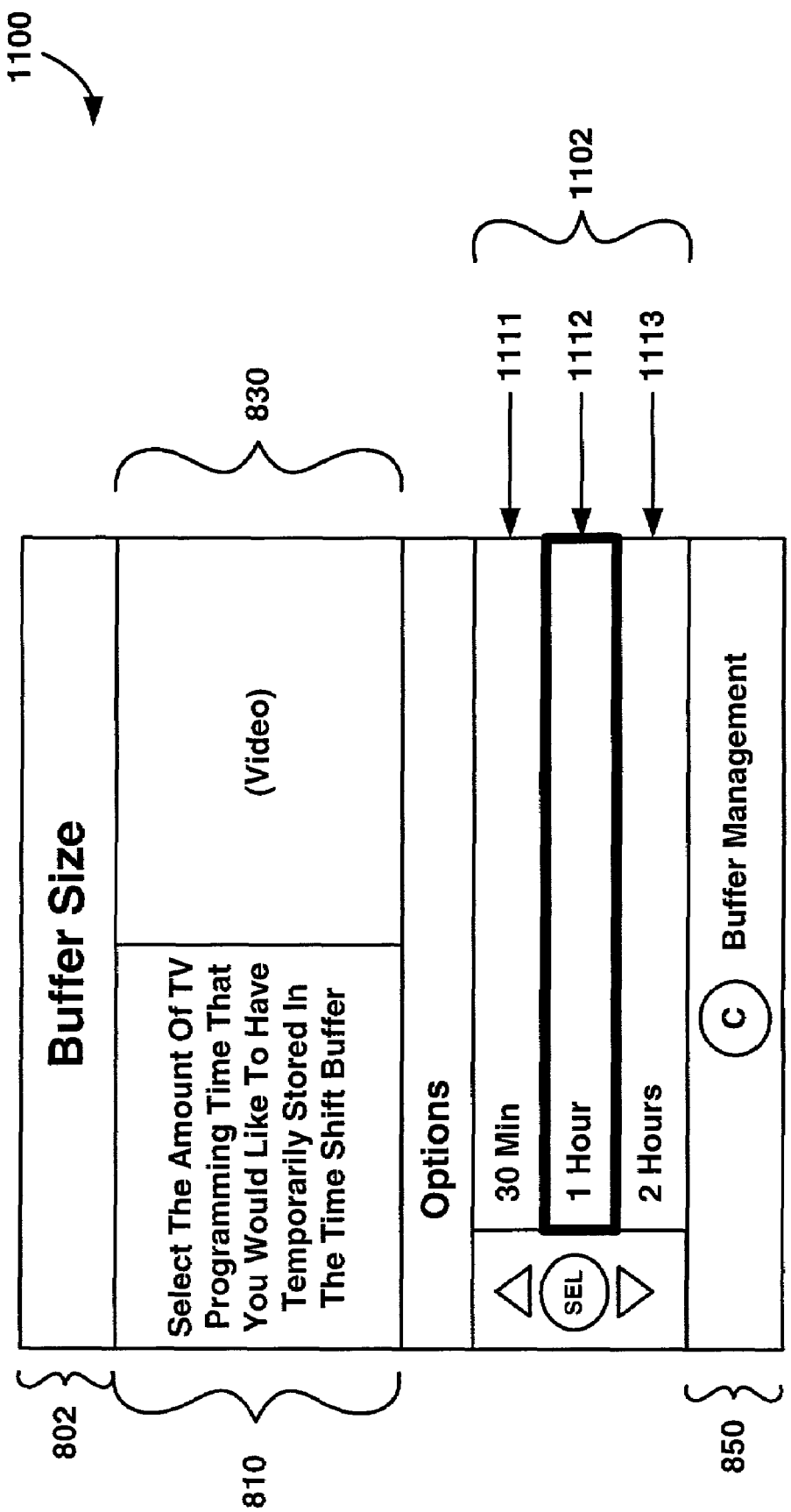
FIG. 11 is a block diagram illustrating an example of a UI screen that includes a list of buffer size options provided by the DHCT depicted in FIG. 1.

FIG. 11 depicts a non-limiting example of a Buffer Size screen 1100 that contains a list of buffer size options 1102 for determining the size of one or more time shift buffers (TSBs). A user may request the Buffer Size screen 1100 by, for example, selecting option 1012 while being presented with the Record Management screen 1000 (FIG. 10). In this example, the list of buffer size options 1102 includes a 30 minute buffer size option 1111, a 1-hour buffer size option 1112, and a 2-hour buffer size option 1113. Other buffer size options may be displayed by scrolling up or down the list of buffer size options 1102. Selecting a buffer size option causes one or more TSBs to have a storage capacity that can accommodate a video stream having a play time indicated by the selected option.

Figure 12A:
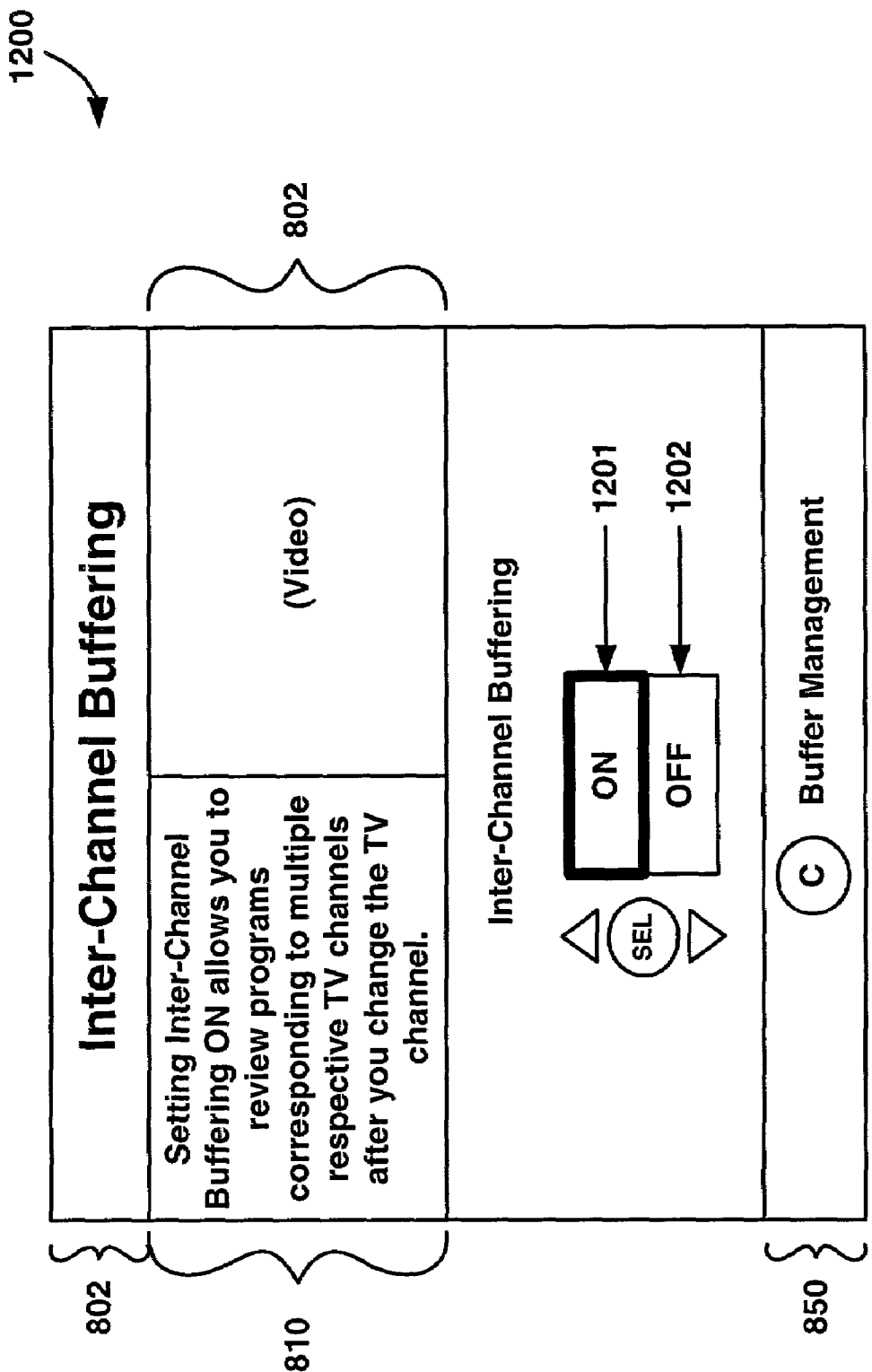
FIG. 12A is a block diagram illustrating an example of a UI screen that includes a list of inter-channel buffering options provided by the DHCT depicted in FIG. 1.

FIG. 12A depicts a non-limiting example of an Inter-Channel Buffering screen 1200 that can be used to activate or de-activate inter-channel buffering. As used herein, inter-channel buffering refers to the ability to access a buffered video stream corresponding to a previously tuned television channel after effecting a change in television channels. A user may request the Inter-Channel Buffering screen 1200 by, for example, selecting option 1013 while being presented with the Record Management screen 1000 (FIG. 10). A user may activate inter-channel buffering by selecting the "ON" option 1201 and may de-activate inter-channel buffering by selecting the "OFF" option 1202. In one embodiment, even after the "OFF" option 1202 is selected, a user may subsequently press the buffer key 436 (FIG. 4) prior to changing TV channels in order to activate inter-channel buffering with respect to the currently displayed channel.

Figure 12B:
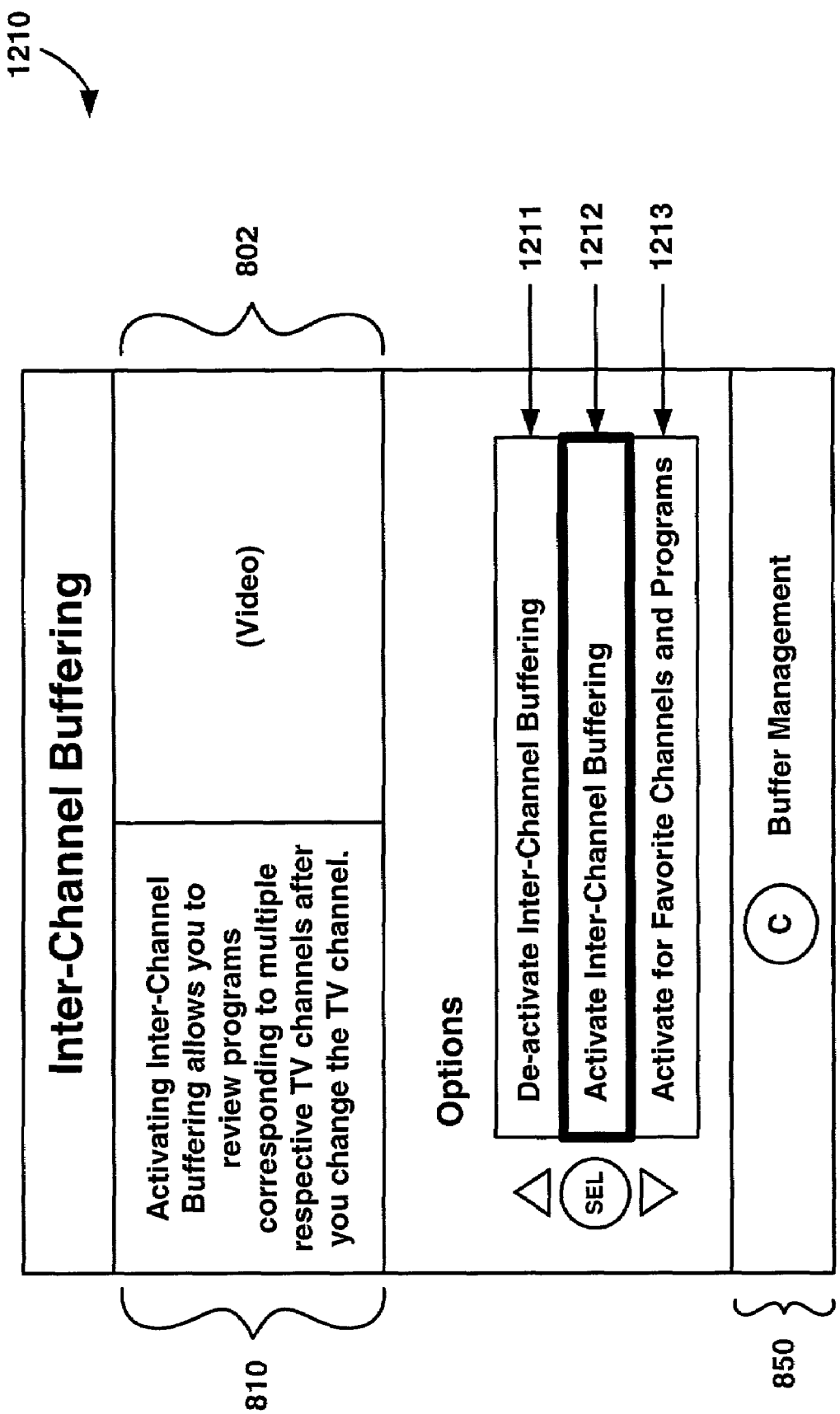
FIG. 12B is a block diagram illustrating another example of a UI screen that includes a list of inter-channel buffering options provided by the DHCT depicted in FIG. 1.

FIG. 12B depicts a non-limiting example of an Inter-Channel Buffering screen 1210 that can be used to activate or de-activate inter-channel buffering. The Inter-Channel Buffering screen 1210 is an alternative embodiment to the Inter-Channel Buffering screen 1200 (FIG. 12A). A user may request the Inter-Channel Buffering screen 1200 by, for example, selecting option 1013 while being presented with the Record Management screen 1000 (FIG. 10). A user may activate inter-channel buffering by selecting the option 1212 and may de-activate inter-channel buffering by selecting option 1212. Furthermore, the user may activate inter-channel buffering only with respect to "favorite" TV channels or video presentations by selecting option 1213.

A favorite channel or presentation may have been identified as such via user input. A list of favorite channels and/or presentations may be stored in a favorites database 374 (FIG. 3). Selecting option 1213 enables a user to access a buffered video stream corresponding to a previously displayed channel after the user changes television channels (e.g., via the Channel +/− key 434), only if the previously displayed channel or presentation had been designated as a "favorite."

Inter-channel buffering with respect to only favorite channels or presentations may be implemented by the PVR application 277. For example, after a user requests a change in television channels, the PVR application 277 may first access an IPG database 372 (containing a television program schedule) (FIG. 3) to identify the currently displayed channel or presentation. The PVR application may then access a favorites database 374 to determine whether the currently displayed channel or presentation had been designated as a favorite. If the currently displayed channel or presentation had been designated as a favorite, then the PVR application 277 may enable the user to access a buffered video presentation corresponding to the favorite channel or presentation after a change in television channels is implemented. Otherwise, the PVR application 277 disables access to the buffered video presentation corresponding to the channel that was displayed prior to a change in channels.

FIG. 13A depicts a non-limiting example of an Buffered Programs List (BPL) screen 1300 that contains a list of buffered video presentations. A user may request the BPL screen 1300 by, for example, selecting option 1011 while being presented with the Record Management screen 1000 (FIG. 10). Alternatively, the BPL screen 1300 may be requested via the activation of a dedicated key on a remote control device.

A buffered programs list 1306 contains buffer entries corresponding to buffered video presentations. Each buffer entry in the buffered programs list 1306 includes information such as the title of a buffered video presentation, the broadcast time of the original video presentation, the available time of the buffered video presentation (i.e., the beginning and end times of the buffering), and an indication as to whether the buffered video presentation is designated to be recorded (i.e., stored as a long-term recording). In one embodiment, the arrow keys 410 (FIG. 4) can be used to scroll through the buffered programs list 1306 and to highlight a desired buffer entry.

The bottom area 850 of BPL screen 1300 contains information about the current functions of relevant keys on the remote control device 400. As suggested in bottom area 850, the play key 421 and the record key 426 may be used to request the playing and recording, respectively, of a video presentation corresponding to a currently highlighted buffer entry 1302. The "A" key 471 may be used to request the recording of all the buffered video presentations, the "B" key 472 may be used to request a UI screen for sorting the buffered video presentation, and the "C" key 473 may be used to "exit" from the BPL screen 1300.

FIG. 13B depicts a non-limiting example of an Buffered Programs List (BPL) screen 1310 that may be presented to a user in response to the activation of the record key 426 (FIG. 4) while being presented with the BPL screen 1300 (FIG. 13A). As shown in FIG. 13B, the highlighted entry 1302 indicates, as shown at 1324, that the buffered video presentation "News at 11" 1322 is designated to be recorded. As soon as the user confirms this designation (e.g., by activating the "C" key 473 (FIG. 4)), then the buffered video presentation "News at 11" 1322 is stored as a long-term recording.

Figure 14:
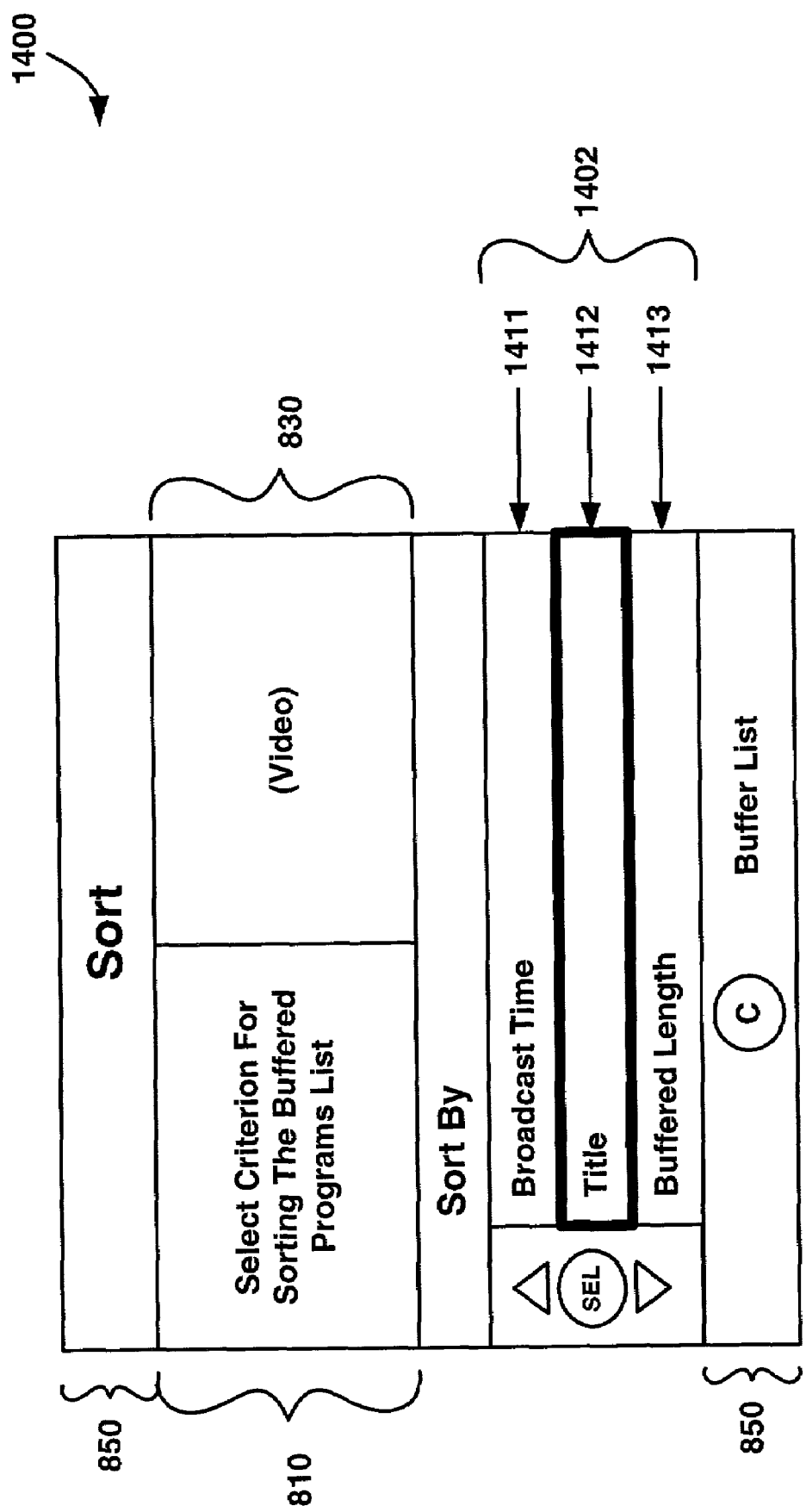
FIG. 14 is a block diagram illustrating an example of a UI screen that includes options for sorting a list video presentations that are buffered by the DHCT depicted in FIG. 1.

FIG. 14 depicts a non-limiting example of a Sort screen 1400 that contains a list of options 1402 for sorting a list of buffered programs (e.g., the buffered programs list 1460 shown in FIG. 13). A user may request the Sort screen 1400 by, for example, activating the "B" key 472 (FIG. 4) while being presented with the BPL screen 1300 (FIG. 13A). In this example, the list of options 1402 includes options 1411, 1412, and 1413 for sorting a list of buffered programs based on broadcast time, title, and buffered length (e.g., play time), respectively. By selecting one of the options 1411-1413, the user is presented with a list of buffered programs that are sorted accordingly (i.e., by broadcast time, title, or buffered length). Additional sorting options may also be selected by using the up and down arrows 411 and 412 on the remote control device 400 to browse through the list of options 1402 and by then using the select button 420 to select a desired sorting option. Additional sorting options may include, for example, an option for sorting a list of buffered programs based on their theme (e.g., comedy, drama, action, etc.).

Figure 15B:

FIGS. 15A, 15B, and 15C depict non-limiting examples of Sorted Buffered Programs List (SBPL) screens 1500, 1510, and 1520, respectively. The SBPL screen 1500 contains a buffered programs list 1306 that is sorted alphabetically by title. A user may request the SBPL 1500 by, for example, selecting the title option 1412 while being presented with the Sort screen 1400 (FIG. 14).

As shown in FIG. 15B, the SBPL screen 1510 contains a buffered programs list 1306 that is sorted based on the play-time duration of the buffered video presentations. As a result, a buffered video presentation that has a longer play-time is listed above another video presentation that has a shorter play-time. A user may request the SBPL 1510 by, for example, selecting the buffered length option 1413 while being presented with the Sort screen 1400 (FIG. 14).

As shown in FIG. 15C, the SBPL screen 1520 contains a buffered programs list 1306 that is sorted based on the broadcast time of the buffered video presentations. In other words, a video presentation that has an earlier start time is listed above another video presentation that has a later start time. A user may request the SBPL 1520 by, for example, selecting the broadcast time option 1411 while being presented with the Sort screen 1400 (FIG. 14).

In an alternative embodiment, a UI screen for achieving functionality described herein may have fewer, additional, and/or different components and/or may have a different layout than is shown in FIGS. 8-15. For example, in accordance with one embodiment, among others, a UI screen may not include a video area 830, a heading area 802, a detailed focus area 810, and/or a bottom area 850.

It should be emphasized that the above-described embodiments of the invention, particularly any "preferred embodiments", are merely possible examples, among others, of the implementations, setting forth a clear understanding of the principles of the invention. Many variations and modifications may be made to the above-described embodiments of the invention without departing substantially from the principles of the invention. All such modifications and variations are intended to be included herein within the scope of the disclosure and invention and protected by the following claims.

The invention claimed is:

1. A method for providing access to buffered data, the method comprising:
   receiving user input specifying whether access is to be provided after a future change in a displayed television channel to a buffered video presentation that is buffered before the future change in the displayed television channel;
   providing the access responsive to the user input specifying that the access is to be provided; and
   preventing the access responsive to the user input specifying that the access is not to be provided.

2. The method of claim 1, wherein the access is provided via a rewind operation.

3. The method of claim 1, wherein the access is provided via a user interface screen containing a list of buffered video presentations.

4. The method of claim 1, wherein the buffered video presentation is buffered in a time-shift buffer (TSB).

5. The method of claim 4, wherein the TSB corresponds to a portion of a hard disk.

6. The method of claim 1, wherein the buffered video presentation corresponds to a video stream that is received via a subscriber television network.

7. The method of claim 1, wherein the buffered video presentation corresponds to a video stream that is received from a local device.

8. The method of claim 1, wherein the user input identifies an option that is provided via a user interface screen.

9. The method of claim 1, wherein the access is provided only if the displayed television channel had been designated as a favorite television channel.

10. The method of claim 1, wherein the access is provided only if the buffered video presentation corresponds to a video presentation that had been designated as a favorite video presentation.

11. The method of claim 1, wherein the user input is provided via a certain remote control key.

12. The method of claim 11, wherein the user input is received within a short time interval prior to receiving a request for the change in the displayed television channel.

13. The method of claim 11, wherein operation of the certain remote control key may be enabled in response to the selection of a certain option via a user interface screen.

14. A digital home communication terminal (DHCT) that is configured to receive user input specifying whether access is to be provided after a future change in a displayed television channel to a buffered video presentation that is buffered before the future change in the displayed television channel, the DHCT comprising:
   a time-shift buffer (TSB) for buffering the buffered video presentation; and
   a processor that is programmed to:
      provide the access to the buffered video presentation responsive to the user input specifying that the access is to be provided; and
      prevent the access to the buffered video presentation responsive to the user input specifying that the access is not to be provided.

15. The DHCT of claim 14, wherein the access is provided via a rewind operation.

16. The DHCT of claim 14, wherein the access is provided via a user interface screen containing a list of buffered video presentations.

17. The DHCT of claim 14, wherein the TSB corresponds to a portion of a hard disk.

18. The DHCT of claim 14, wherein the buffered video presentation corresponds to a video stream that is received via a subscriber television network.

19. The DHCT of claim 14, wherein the buffered video presentation corresponds to a video stream that is received from a local device.

20. The DHCT of claim 14, wherein the user input identifies an option that is provided via a user interface screen.

21. The DHCT of claim 14, wherein the access is provided only if the displayed television channel had been designated as a favorite television channel.

22. The DHCT of claim 14, wherein the access is provided only if the buffered video presentation corresponds to a video presentation that had been designated as a favorite video presentation.

23. The DHCT of claim 14, wherein the user input is provided via a certain remote control key.

24. The DHCT of claim 23, wherein the user input is received within a short time interval prior to receiving a request for the change in the displayed television channel.

25. The DHCT of claim 23, wherein operation of the certain remote control key may be enabled in response to the selection of a certain option via a user interface screen.

26. A method for providing access to buffered data, the method comprising:
receiving user input specifying whether access is to be provided after a future change in a displayed television channel to a buffered video presentation that is buffered before the future change in the displayed television channel;
providing the access responsive to the user input specifying that the access is to be provided;
preventing the access responsive to the user input specifying that the access is not to be provided;
wherein the access is provided via a rewind operation;
wherein the buffered video presentation is buffered in a time-shift buffer (TSB);
wherein the TSB corresponds to a portion of a hard disk;
wherein the buffered video presentation corresponds to a video stream that is received via a subscriber television network; and
wherein the user input identifies an option that is provided via a user interface screen.

* * * * *